United States Patent
Pogue et al.

(10) Patent No.: US 12,278,703 B1
(45) Date of Patent: Apr. 15, 2025

(54) DATA TRANSMISSION PROTOCOL

(71) Applicant: Amazon Technologies, Inc., Seattle, WA (US)

(72) Inventors: Michael Pogue, Sunnyvale, CA (US); Juraj Svec, Livermore, CA (US); Shao-Cheng Wang, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 325 days.

(21) Appl. No.: 17/710,309

(22) Filed: Mar. 31, 2022

(51) Int. Cl.
*H04L 1/08* (2006.01)
*H04B 17/318* (2015.01)
*H04L 43/0829* (2022.01)
*H04W 24/08* (2009.01)

(52) U.S. Cl.
CPC ............ *H04L 1/08* (2013.01); *H04B 17/318* (2015.01); *H04L 43/0835* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 2008/0123579 A1* | 5/2008 | Kozat | .................. | H04L 1/1887 370/312 |
| 2010/0023828 A1* | 1/2010 | Weinman | ............ | H04L 12/1868 714/748 |
| 2011/0211468 A1* | 9/2011 | Zhang | .................. | H04L 1/0002 370/252 |
| 2011/0211517 A1* | 9/2011 | Moscibroda | .......... | H04L 1/0015 370/312 |
| 2012/0140648 A1* | 6/2012 | Bejerano | ............... | H04L 12/189 370/312 |
| 2012/0213097 A1* | 8/2012 | Bejerano | ............... | H04L 1/1867 370/312 |
| 2014/0376387 A1* | 12/2014 | Shin | ...................... | H04W 24/04 370/245 |
| 2021/0028890 A1* | 1/2021 | Rico Alvarino | ...... | H04W 72/23 |
| 2021/0306103 A1* | 9/2021 | Young | ..................... | H04W 4/80 |
| 2022/0038866 A1* | 2/2022 | Kadiri | ................... | H04L 1/1816 |
| 2022/0400392 A1* | 12/2022 | Ergen | .................... | H04W 24/08 |

* cited by examiner

*Primary Examiner* — Benjamin Lamont

(74) *Attorney, Agent, or Firm* — Lee & Hayes, P.C.

(57) ABSTRACT

Systems and methods for data transmission protocols are disclosed. For example, a receiving device is selected to send retransmission requests when data packet loss occurs, and then a unicast transmission of data packets may be sent to that selected receiving device. Other receiving devices may be configured to receive the unicast transmission as sent to the selected receiving device and to process the transmission as a multicast transmission. Alternatively, a multicast transmission may be sent to all of the receiving devices, and the selected receiving device may be configured to process the multicast transmission as a unicast transmission for the purpose of sending retransmission requests indicating packet loss. Backup packets may be generated and sent to all of the receiving devices to improve content output quality.

20 Claims, 15 Drawing Sheets

1000

Designate first device to receive first content data utilizing unicast transmission, wherein unicast transmission includes first identifier of first device that is designated to utilize first content data for content output, wherein first wireless component of second device has been configured to utilize data packets sent as unicast transmission and directed to first device for content output
1002

Send, utilizing multicast transmission, first data packets representing first content data to first device and to second device
1004

Receive, from first device and based at least in part on enabling first device to send data configured to be utilized for determining packet loss in response to multicast transmission, data indicating packet loss
1006

Send, to first device and utilizing unicast transmission, second data packets representing packets lost at first device, wherein sending second data packets causes first device to receive second data packets as unicast transmission and causes second device to utilize second data packets for content output
1008

FIG. 10

DATA TRANSMISSION PROTOCOL

BACKGROUND

Electronic devices may be configured to wirelessly send data. Such data may be sent from a sending device to multiple receiving devices in data packets. Described herein are improvements in technology and solutions to technical problems that can be used to, among other things, improve data packet transmission.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 10 illustrates a flow diagram of another example process for sending content data utilizing a data transmission protocol.

DETAILED DESCRIPTION

Figure 1:
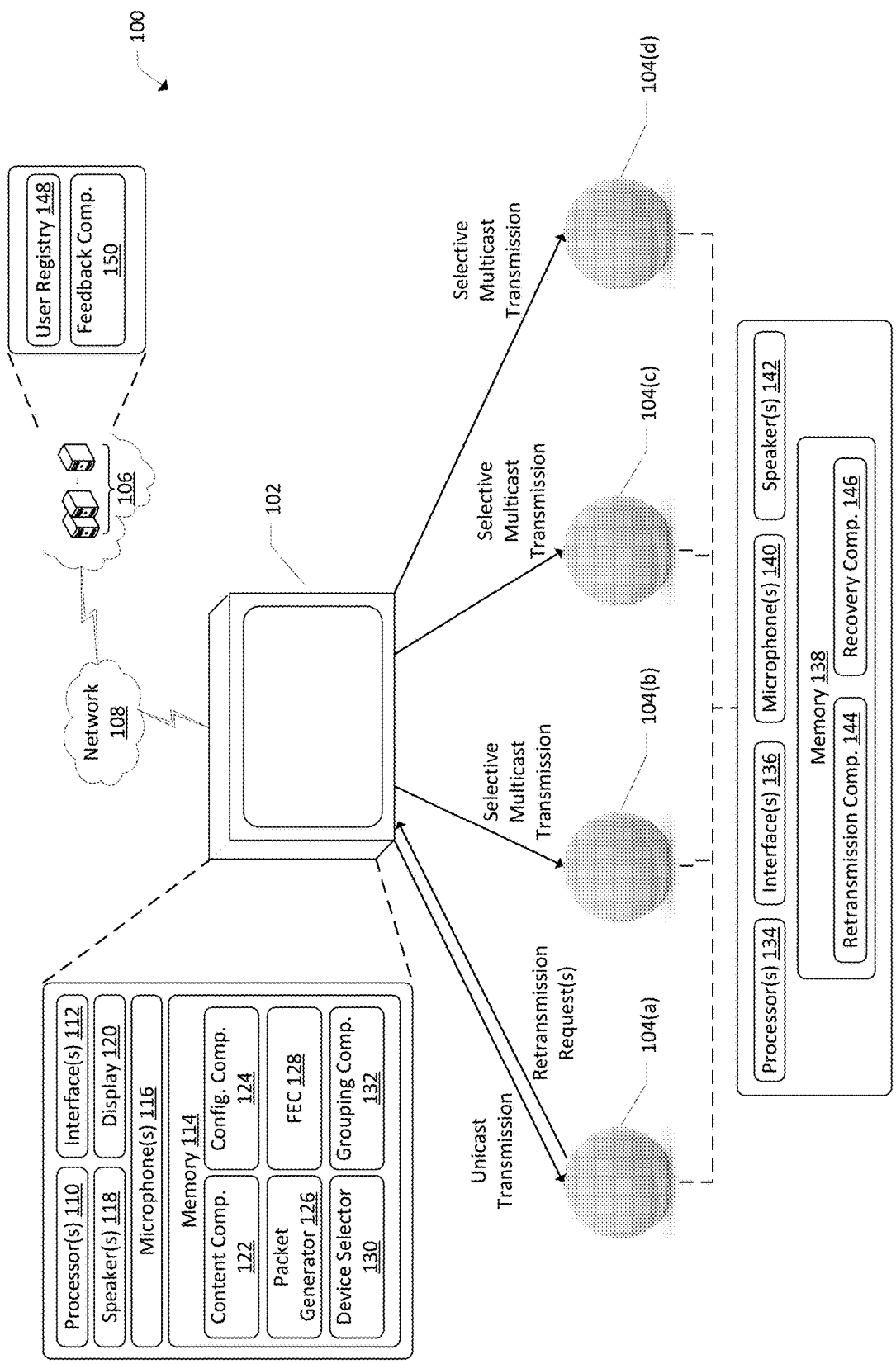
FIG. 1 illustrates a schematic diagram of an example environment for data transmission protocols.

Systems and methods for data transmission protocols are disclosed. Take, for example, an environment (such as a home, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place a business, healthcare facility (e.g., hospital, doctor's office, pharmacy, etc.), in vehicle (e.g., airplane, truck, car, bus, etc.) in a public forum (e.g., shopping center, store, etc.), for example.

In examples, at least one of the electronic devices may be configured to receive content data, such as from one or more of the other electronic devices and/or from another component of a system. As used herein, data distribution devices are those devices that are configured to send content data to one or more receiving devices. The content data may include various types of content, such as audio data, image data, text data, and/or other data. When the content data includes image data, the data distribution device may be configured to display corresponding images. When the content data includes audio data, the data distribution device may be configured to output corresponding audio. However, in certain examples, the data distribution device may not be configured to present certain types of content and/or preferences may indicate that another device is to present the content at issue. For example, the data distribution device may not include a display and thus may not be configured to present images. In still other examples, additional devices associated with the data distribution device may be configured to output audio instead of or in addition to the data distribution device outputting audio, such as in a whole-home audio configuration and/or a stereo speaker configuration. In these and other examples, the data distribution device may send all or a portion of the content data to one or more receiving devices for the receiving devices to output corresponding content. It should be understood that while the several examples provided herein illustrate the sending of audio data from the data distribution device to one or more receiving devices, such that the receiving devices output corresponding audio while the data distribution device, in examples, outputs images associated with the audio data, the generation of data packets and the sending of the same may include data other than audio data.

Generally, when content data is sent between devices, the sending device may generate data packets that include the content data. The data packets may include a header portion that indicates the sequence of the packets as well as, in examples, other identifying information associated with the data packets. The data packets may also include a payload portion that includes, for each individual packet, at least a portion of the content data. These packets may be sent to the receiving device(s). However, some packets may be lost during transmission. Packet loss may be defined as occurring when a given packet is not received at all at a receiving device and/or when a given packet is received at the receiving device but is received too late to be utilized for outputting the content associated with the packet. Packet loss may result from one or more factors, including transmission interference by other devices, physical impedances, network issues, etc. When packets are lost, the quality of the content output by the receiving device may be impaired. As such, being able to recover lost packets would be beneficial for diminishing the impact lost packets has on content-output quality.

Multiple data transmission protocols may be utilized to decrease bandwidth and airtime use during content data transmission. For example, a unicast transmission protocol may be utilized, and in this example the data distribution device may send data packets to each of the receiving devices individually using individual unicast transmissions. For example, the data distribution device may send a first unicast transmission to a first receiving device, a second unicast transmission to a second receiving device, a third unicast transmission to a third receiving device, etc. A benefit of doing so is that the receiving devices are configured to send retransmission requests indicating lost packets back to the data distribution device. The data distribution device may utilize these retransmission requests to send backup packets. In other examples, retransmission requests are not sent but packet acknowledgements are sent that indicate which packets have been received at the receiving device. This data may be utilized by the content distribution device to determine which packets were lost. However, the bandwidth and airtime needed to send individual unicast transmissions to multiple receiving devices is much higher than if a single multicast transmission was sent. For example, if the data distribution device is to send the content data to five receiving devices, the airtime needed to send that content data is five times more than if the data distribution device sent the content data in a single multicast transmission. However, when multicast transmissions are utilized, retransmission requests and/or other data utilized to determine packet loss are not sent back to the data distribution device, and thus backup packets are not sent in response to retransmission requests and/or other data utilized to determine packet loss.

Described herein are innovations that allow for the data distribution device and the receiving devices to utilize a transmission protocol to achieve the benefits of minimized airtime utilization along with the receipt and use of retransmission requests to send backup packets. For example, a content component of the data distribution device may be configured to receive content data from one or more sources, such as from another component of a system associated with the data distribution device. In examples, a user may request content be output on the one or more devices associated with a given environment. The data distribution device and/or another device in the environment may receive user input indicating this request, and corresponding user input data may be sent to a system, such as a content provider. The system may send the content data to the data distribution device, which may initiate a process for providing at least a portion of the content data to the one or more receiving devices. By way of example, the data distribution device may determine that it is to output images corresponding to an image data portion of the content data while receiving devices, say four receiving devices by way of example, are to output an audio data portion of the content data. In this example, the data distribution device may be configured to send data packets representing the audio data to the four receiving devices.

Prior to sending the data packets, a configuration component of the data distribution device may be configured to determine a configuration of the receiving devices. For example, the data distribution device may query the receiving devices, either on the fly or prior to the request to output content by the user, for information indicating a configuration of the receiving devices. This configuration data may include an identifier of a given receiving device, a manufacturer of the receiving device, audio-output capabilities, received signal strength indicator (RSSI) data, etc. Additionally, the configuration data may indicate whether a given receiving device has been configured to receive content data utilizing the transmission protocols described herein. For example, as explained in more detail below, the transmission protocols described herein may require hardware, firmware, and/or software of the receiving devices to be configured in a certain way. For example, a wireless chipset of a given receiving device and/or another component of the receiving device may be configured to receive and process data packets sent to a predetermined internet protocol (IP) address that differs from typically-used IP addresses for unicast transmissions. In other examples, the wireless chipset and/or another component of a given receiving device may be configured to process data packets that include certain information in, for example, a header portion of the packet. This information may include predetermined quality of service (QOS) information, predetermined device identifier information, a predetermined preamble in the header, etc. The configuration data may indicate whether the receiving devices are configured to utilize this information to process received data packets.

A device selector of the data distribution device may be configured to utilize the configuration data to select one of the receiving devices to send retransmission requests in response to determining that packets have been lost. In this example, the data distribution device may be configured to send a unicast transmission to the selected receiving device. By doing so, generally, the selected receiving device may receive the unicast transmission and may be configured to process the unicast transmission. Additionally, the other receiving devices may also be configured to process the unicast transmission sent to the selected receiving device even though it is a unicast transmission that was not sent specifically to the other receiving devices. To do so, the wireless chipsets and/or other components of the other receiving devices may be configured to determine whether the data packets sent using the unicast transmission include the predetermined data, such as the predetermined IP address, preamble, QoS information, etc. indicating that the other receiving devices are to treat the unicast transmission as a multicast transmission sent to those devices. By so doing, the other receiving devices may be configured to "listen in" to the unicast transmission sent to the selected device and to process the data packets as a multicast transmission. In this example, the data distribution device sends a single transmission, the unicast transmission, that is received and processed on the selected receiving device as a unicast transmission and is received and processed on the other receiving devices as a multicast transmission. The selected receiving device, which receives the content data as a unicast transmission, sends retransmission requests indicating packet loss at the selected receiving device to the data distribution device. The data distribution device may utilize those retransmission requests to generate backup packets, which may also be sent utilizing the unicast transmission to the selected receiving device. The backup packets may include the predetermined data that allows the other receiving devices to receive and process the backup packets. By so doing, packet loss across the receiving devices is mitigated while airtime of sending the content data is minimized.

In another example, instead of the data distribution device sending a unicast transmission to a selected receiving device, the data distribution device may send one multicast transmission to all of the receiving devices, but may send a command and/or other information to one of the receiving devices that causes that receiving device to treat the multicast transmission as a unicast transmission for the purpose of sending retransmission requests back to the data distribution device. For example, the device selector may select one of the receiving devices as described herein. The data distribution device may send, prior to sending the content data, a command to the selected receiving device indicating that the receiving device is to treat received content data as a unicast transmission even if the content data is received as a multicast transmission. In other examples, when the data distribution device sends the content data as the multicast transmission, the header of the data packets may be configured to include predetermined data that indicates the selected receiving device is to treat the multicast transmission as a unicast transmission. The selected receiving device may then send retransmission requests back to the data distribution device for backup packet generation as described herein. By so doing, the data distribution device may send a single multicast transmission to all of the receiving devices to minimize airtime while still mitigating packet loss as determined by the selected receiving device.

In the examples provided above, and in other examples, the device selector may be configured to select a receiving device that is most likely to have associated lost packets and/or that is most likely to have the greatest amount of lost packets. To do so, the device selector may be configured to utilize one or more data types to determine which receiving device to select. The data types may include any or all of the configuration data described above, including device types, RSSI values, feedback data, device compliance data, and/or other inputs including inputs indicated as relevant for packet loss by one or more machine learning models. For example, the device type data may indicate frequency ranges that a given receiving device is configured to output audio in. In these examples, a subwoofer device may be configured to output audio at a first frequency range, while a tweeter device or other device may be configured to output audio at a second frequency range that is higher than the subwoofer device. Generally, packet loss at the subwoofer device may result in impaired sound quality that is less noticeable to the human ear than packet loss at devices that output audio at higher frequency ranges. As such, the receiving device that outputs audio at higher frequency ranges may be selected instead of the subwoofer device. Additionally, the RSSI values may be utilized to determine distances between the data distribution device and the receiving devices in an environment, and/or to determine which devices receive the most signal impedance based on their location in an environment with respect to other devices and objects of the environment. In these examples, the receiving device with the lowest RSSI values is likely to experience the most packet loss from the data distribution device, and as such may be selected to send retransmission requests. Additionally, the device compliance data may indicate which of the receiving devices is not configured to receive the transmissions described herein, or otherwise does not include wireless chipsets and/or other components that are configured to process received content data as described herein. By way of example, if one of the receiving devices is not configured to receive the transmissions but the other receiving devices are so configured, the receiving device not configured to receive the transmissions may be selected and a unicast transmission may be sent to that device.

In addition to the above, or alternatively, a feedback process may be initiated to determine which receiving device to select as described herein. Take for example an environment that includes three receiving devices. Each of the three receiving devices may be selected for a given period of time, and retransmission requests indicating packet loss may be received from each of the receiving devices during the respective periods of time when they are selected to provide retransmission requests. The amount and characteristics of these retransmission requests may be analyzed to determine which receiving device experiences the most packet loss and/or packet loss that most impacts content-output quality. That device may be selected as the receiving device to send retransmission requests for subsequent content data sent by the data distribution device. This process may be repeated when changes to the environment occur, such as when a new device is added to the environment, a device is removed from the environment, an internet configuration of the environment changes, device locations change, etc. In addition to the above, one or more machine learning models may be trained to determine factors that impact packet loss and/or to determine how to weight the factors described above. These factors and/or weightings indicated by the trained machine learning models may be utilized to select a given receiving device that is to send retransmission requests.

A grouping component of the data distribution device may be configured to determine whether receiving devices should be grouped to most optimally minimize airtime while mitigating packet loss. For example, feedback data may indicate that packet loss differs between a first set of devices and a second set of devices. In these examples, the sets of devices may be grouped separately and a first transmission may be sent to a first group of the receiving devices while a second transmission may be sent to a second group of the receiving devices. While this process requires two unicast transmissions, and thus may require more airtime than a single multi-cast, the process has the advantage of better aligning backup packet generation with packet loss experienced by the specific groups. Additionally, when more than one receiving device is not configured to receive the transmissions described herein, those noncompliant devices may be grouped together while the compliant receiving devices may be grouped together in a separate group. In this example, the transmission protocols described herein may be utilized for the compliant group of devices, while a multicast transmission of the original content data and any backup packets as determined from the compliant group may be utilized for the noncompliant group. By doing so, in examples, only a single compliant receiving device may be needed to achieve the benefits of the transmission protocol across all receiving devices in an environment.

Additionally, or alternatively, in certain examples only a subset of available receiving devices may be selected to output content. Take for example an environment that includes five receiving devices, but where only four of the receiving devices are selected to output the content. In certain examples, at least one of the four receiving devices is configured to utilize the transmission protocol described herein. In this example, that receiving device may be selected for retransmission request sending as described herein. However, in other examples, none of the four receiving devices may be configured to receive and process the transmissions. In these examples, a "silent node" may be established. The silent node may be a receiving device, here the fifth receiving device, that is configured to utilize the transmission protocol but that can be configured to not output the content received at the device. In this example, the silent node may determine packet loss and send retransmission requests as described herein without outputting content representing the content data received at the silent node. Those retransmission requests may be utilized by the data distribution device to generate and send backup packets to the four other receiving devices to mitigate packet loss while also not outputting the content on a device that was not selected to output such content.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for data transmission protocols. The system 100 may include, for example, a data distribution device 102, which may include a communal device and/or a personal device. In certain examples, the device 102 may be a voice-enabled device (e.g., Echo devices, mobile phones, tablets, personal computers, etc.), a video interface device (e.g., televisions, set top boxes, virtual/augmented reality headsets, etc.), a touch interface device (tablets, phones, laptops, kiosks, billboard, etc.), and/or an accessory device (e.g., lights, plugs, locks, thermostats, appliances, televisions, clocks, smoke detectors, doorbells, cameras, motion/magnetic/other security-system sensors, etc.). The data distribution device 102 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The system 100 may also include one or more receiving devices 104(a)-(d). The receiving devices 104(a)-(d) may be configured to receive data packets from the data distribution device 102 and to perform operations associated with reconstruction of lost packets, as described herein. The system 100 may also include one or more personal devices, which may be electronic devices, such as a mobile phone, tablet, laptop, wearable device, and/or other computing device that is specifically associated with a given user profile. The data distribution devices 102, receiving devices 104(a)-(d), and the personal devices may be configured to send data to and/or receive data from another component of a system 106, such as via a network 108. Additionally, it should be understood that a given space and/or environment may include numerous data distribution devices 102 and/or receiving devices 104(a)-(d) and/or personal devices. It should also be understood that when a "space" or "environment" is used herein, those terms mean an area and not necessarily a given room, building, or other structure, unless otherwise specifically described as such.

The data distribution devices 102 may include one or more components, such as, for example, one or more processors 110, one or more network interfaces 112, memory 114, one or more microphones 116, one or more speakers 118, and/or one or more displays 120. The microphones 116 may be configured to capture audio, such as user utterances, and generate corresponding audio data. The speakers 118 may be configured to output audio, such as audio corresponding to audio data received from another device and/or the system 106. The displays 120 may be configured to display images corresponding to image data, such as image data received from the system 106 and/or one or more other devices, such as the receiving devices 104(a)-(d). It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 108 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices. The memory 114 of the electronic device 102 may include one or more components, such as for example, a content component 122, a configuration component 124, a packet generator 126, a forward error correction (FEC) component 128, a device selector 130, and/or a grouping component 132. Each of these components will be described in detail by way of example below.

The receiving devices 104(a)-(d) may include one or more components, such as for example, one or more processors 134, one or more network interfaces 136, memory 138, one or more microphones 140, and/or one or more speakers 142. The microphones 140 and/or the speakers 142 may be the same or similar to, and/or may perform the same or similar functions as, the microphones 116 and/or the speakers 118 discussed with respect to the electronic device 102. The memory 138 may include one or more components, such as for example, a retransmission component 144 and/or a recovery component 146. Each of these components will be described below in detail by way of example.

The system 106 may include components such as, for example, a user registry 148 and/or a feedback component 150. While not depicted, the system 106 may also include a speech-processing system. It should be understood that while the speech-processing system and the other components are depicted and/or described as separate from each other in FIG. 1, some or all of the components may be a part of the same system. The speech-processing system may include an automatic speech recognition component (ASR) and/or a natural language understanding component (NLU). Each of the components described herein with respect to the remote system 106 may be associated with their own systems, which collectively may be referred to herein as the system 106, and/or some or all of the components may be associated with a single system. Additionally, the system 106 may include one or more applications, which may be described as skills. "Skills," as described herein may be applications and/or may be a subset of an application. For example, a skill may receive data representing an intent. For example, an intent may be determined by the NLU component and/or as determined from user input via a computing device. Skills may be configured to utilize the intent to output data for input to a text-to-speech component, a link or other resource locator for audio data, and/or a command to a device, such as the data distribution device 102.

In instances where a voice-enabled device is utilized, skills may extend the functionality of devices 102, 104(a)-(d) that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the data distribution device 102, the receiving device(s) 104(a)-(d), and the system 106 are described in detail below: In examples, some or each of the components of the system 106 may include their own processor(s), network interface(s), and/or memory. As such, by way of example, the speech-processing system may include and/or be associated with processor(s), network interface(s), and/or memory. The other components of the system 106, such as the feedback component 150, may include and/or be associated with different processor(s), network interface(s), and/or memory, or one or more of these components may utilize some or all of the same processor(s), network interface(s), and/or memory utilized by the speech-processing system. These components are described in detail below: Additionally, the operations and/or functionalities associated with and/or described with respect to the components of the system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 148 may be configured to determine and/or generate associations between users, user accounts, and/or devices. For example, one or more associations between user accounts may be identified, determined, and/or generated by the user registry 148. The user registry 148 may additionally store information indicating one or more applications and/or resources accessible to and/or enabled for a given user account. Additionally, the user registry 148 may include information indicating device identifiers, such as naming identifiers, associated with a given user account, as well as device types associated with the device identifiers. The user registry 148 may also include information indicating user account identifiers, naming indicators of devices associated with user accounts, and/or associations between devices, such as the devices 102, 104(a)-(d). The user registry 148 may also include information associated with usage of the devices 102, 104(a)-(d). It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data. The user registry 148 may also include data indicating which receiving devices 104(a)-(d) are associated with which data distribution devices 102 and/or whether a given receiving device 104(a)-(d) is enabled to output content instead of a data distribution device 102.

The speech-processing system may be configured to receive audio data from the devices 102, 104(a)-(d) and/or other devices and perform speech-processing operations. For example, the ASR component may be configured to generate text data corresponding to the audio data, and the NLU component may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "play Video A," the NLU component may identify a "play" intent and the payload may be "Video A." In this example where the intent data indicates an intent to play content with a naming indicator of "Video A," the speech-processing system may call one or more speechlets to effectuate the intent. Speechlets, as described herein may otherwise be described as applications and may include functionality for utilizing intent data to generate directives and/or instructions. For example, a content speechlet may be called when the intent indicates that content is to be retrieved for sending to a device. The speechlet may be designated as being configured to handle the intent of sending requested content, for example. The speechlet may receive the intent data and/or other data associated with the user utterance from the NLU component, such as by an orchestrator of the system 106, and may perform operations to instruct the device 102, 104(a)-(d) to output the content, for example. The system 106 may generate audio data confirming that requested content has been provided, such as by a text-to-speech component. The audio data may be sent from the system 106 to the data distribution device 102 for output of corresponding audio by the speakers 118 of the device 102.

The various components of the data distribution device 102, the receiving devices 104(a)-(d), and the system 106 will now be described by way of example. In examples, the data distribution device 102 may be configured to receive content data, such as from one or more other devices and/or from another component of a system 106. For example, the content component 122 may be configured to receive the content data from the system 106. The content data may include various types of content, such as audio data, image data, text data, and/or otherwise multimedia data. When the content data includes image data, the data distribution device 102 may be configured to display corresponding images. When the content data includes audio data, the data distribution device 102 may be configured to output corresponding audio. However, in certain examples, the data distribution device 102 may not be configured to present certain types of content. For example, the data distribution device 102 may not include a display and thus may not be configured to present images. In still other examples, the receiving devices 104(a)-(d) associated with the data distribution device 102 may be configured to output audio instead of the data distribution device 102 outputting audio, such as in a whole-home audio configuration. In these and other examples, the data distribution device 102 may send all or a portion of the content data to one or more of the receiving devices 104(a)-(d) for the receiving devices 104(a)-(d) to output corresponding content. It should be understood that while the several examples provided herein illustrate the sending of audio data from the data distribution device 102 to one or more receiving devices 104(a)-(d), such that the receiving devices 104(a)-(d) output corresponding audio while the data distribution device 102, in examples, outputs images associated with the audio data, the generation of data packets and the sending of the same may include data other than audio data. The user registry 148 of the system 106 may be utilized to determine whether there are one or more receiving devices 104(a)-(d) that are configured to output content instead of or in addition to the data distribution device 102.

Prior to sending data packets as described herein, the configuration component 124 may be configured to determine a configuration of the receiving devices 104(a)-(d). For example, the data distribution device 102 may query the receiving devices 104(a)-(d), either on the fly or prior to the request to output content by the user, for information indicating a configuration of the receiving devices 104(a)-(d). This configuration data may include an identifier of a given receiving device 104(a)-(d), a manufacturer of the receiving device 104(a)-(d), audio output capabilities, RSSI data, etc. Additionally, the configuration data may indicate whether a given receiving device 104(a)-(d) has been configured to receive content data utilizing the protocols described herein. For example, the transmission protocols described herein may require hardware, firmware, and/or software of the receiving devices 104(a)-(d) to be configured in a certain way. For example, a wireless chipset and/or another component of a given receiving device 104(a)-(d) may be configured to receive and process data packets sent to a predetermined IP address that differs from typically-used IP addresses for unicast transmissions. In other examples, the wireless chipset and/or another component of a given receiving device may be configured to process data packets that include certain information in, for example, a header portion of the packet. This information may include predetermined QoS information, predetermined device identifier information, a predetermined preamble in the header, etc. The configuration data may indicate whether the receiving devices 104(a)-(d) are configured to utilize this information to process received data packets. It should be understood that while several examples of device configurations have been provided herein for the purpose of causing a receiving device to act as if a unicast transmission is a multicast transmission and/or vice versa, any data and/or command may be utilized to cause the transmission protocol to be accepted and utilized by the receiving devices.

The device selector 130 may be configured to utilize the configuration data to select one of the receiving devices 104(a)-(d) to send retransmission requests in response to determining that packets have been lost. It should be understood that anywhere where retransmission requests are described herein as being sent, the receiving devices 104(a)-(d) may instead send data that acknowledges which packets were received at the receiving device, and this data may be utilized by the data distribution device 102 to determine which packets have and have not been received. In this example, the data distribution device 102 may be configured to send a unicast transmission to the selected receiving device, depicted as device 104(a) in FIG. 1. By doing so, generally, the selected receiving device 104(a) may receive the unicast transmission and may be configured to process the unicast transmission. Additionally, the other receiving devices 104(b)-(d) may also be configured to process the unicast transmission sent to the selected receiving device 104(a) even though it is a unicast transmission that was not sent specifically to the other receiving devices 104(b)-(d). To do so, wireless chipsets and/or other components of the other receiving devices 104(b)-(d) may be configured to determine whether the data packets sent using the unicast transmission include the predetermined data, such as the predetermined IP address, preamble, QoS information, etc. indicating that the other receiving devices 104(b)-(d) are to treat the unicast transmission as a multicast transmission sent to those devices. For example, in a typical unicast transmission, the data distribution device 102 may indicate the IP address associated with a specific receiving device that is to receive and process the content data. Other devices that receive the unicast transmission determine that the included IP address does not correspond to those devices' IP addresses, and the data packets are discarded. Here, however, the data distribution device 102 may include the IP address of the selected receiving device 104(a) as well as a default IP address associated with the transmission protocol. The other receiving devices 104(b)-(d) may receive the unicast transmission and may identify the default IP address, which may cause the other receiving devices 104(b)-(d) to process the transmission as a multicast transmission. By so doing, the other receiving devices 104(b)-(d) may be configured to "listen in" to the unicast transmission sent to the selected receiving device 104(a) and to process the data packets as a multicast transmission.

In this example, the data distribution device 102 sends a single transmission, the unicast transmission, that is received and processed on the selected receiving device 104(a) as a unicast transmission and is received and processed on the other receiving devices 104(b)-(d) as a multicast transmission. The selected receiving device 104(a), which receives the content data as a unicast transmission, sends retransmission requests indicating packet loss at the selected receiving device 104(a) to the data distribution device 102. The data distribution device 102 may utilize those retransmission requests to generate backup packets, which may also be sent utilizing the unicast transmission to the selected receiving device 104(a). Again, the backup packets may include the predetermined data that allows the other receiving devices 104(b)-(d) to receive and process the backup packets. By so doing, packet loss across the receiving devices 104(a)-(d) is mitigated while airtime of sending the content data is minimized.

In another example, instead of the data distribution device 102 sending a unicast transmission to a selected receiving device 104(a), the data distribution device 102 may send one multicast transmission to all of the receiving devices 104(a)-(d), but may send a command and/or other information to one of the receiving devices 104(a) that causes that receiving device 104(a) to treat the multicast transmission as a unicast transmission for the purpose of sending retransmission requests back to the data distribution device 102. For example, the device selector 130 may select one of the receiving devices 104(a)-(d) as described herein. The data distribution device 102 may send, prior to sending the content data, a command to the selected receiving device 104(a) indicating that the receiving device 104(a) is to treat received content data as a unicast transmission even if the content data is received as a multicast transmission. In other examples, when the data distribution device 102 sends the content data as the multicast transmission, the header of the data packets may be configured to include predetermined data that indicates the selected receiving device 104(a) is to treat the multicast transmission as a unicast transmission. The selected receiving device 104(a) may then send retransmission requests back to the data distribution device 102 for backup packet generation as described herein. By so doing, the data distribution device 102 may send a single multicast transmission to all of the receiving devices 104(a)-(d) to minimize airtime while still mitigating packet loss as determined by the selected receiving device 104(a).

In the examples provided above, and in other examples, the device selector 130 may be configured to select a receiving device 104(a)-(d) that is most likely to have associated lost packets and/or that is most likely to have the greatest amount of lost packets. To do so, the device selector 130 may be configured to utilize one or more data types to determine which receiving device 104(a)-(d) to select. The data types may include any or all of the configuration data described above, including device types, RSSI values, feedback data, device compliance data, and/or other inputs including inputs indicated as relevant for packet loss by one or more machine learning models. For example, the device type data may indicate frequency ranges that a given receiving device 104(a)-(d) is configured to output audio in. In these examples, a subwoofer device may be configured to output audio at a first frequency range, while a tweeter device or other device may be configured to output audio at a second frequency range that is higher than the subwoofer device. Generally, packet loss at the subwoofer device may result in impaired sound quality that is less noticeable to the human ear than packet loss at devices that output audio at higher frequency ranges. As such, the receiving device 104(a)-(d) that outputs audio at higher frequency ranges may be selected instead of a subwoofer device. Additionally, the RSSI values may be utilized to determine distances between the data distribution device 102 and the receiving devices 104(a)-(d) in an environment, and/or to which devices receive the most signal impedance based on their location in an environment with respect to other devices and objects of the environment. In these examples, the receiving device 104(a)-(d) with the lowest RSSI values is likely to experience the most packet loss from the data distribution device 102, and as such may be selected to send retransmission requests. Additionally, the device compliance data may indicate which of the receiving devices 104(a)-(d) is not configured to receive the transmissions described herein, or otherwise does not include wireless chipsets and/or other components that are configured to process received content data as described herein. By way of example, if one of the receiving devices 104(a)-(d) is not configured to receive the transmissions but the other receiving devices 104(a)-(d) are so configured, the receiving device 104(a)-(d) not configured to receive the transmissions may be selected and a unicast transmission may be sent to that device.

In addition to the above, or alternatively, a feedback process may be initiated to determine which receiving device 104(a)-(d) to select as described herein. Take for example an environment that includes three receiving devices 104(a)-(c). Each of the three receiving devices 104(a)-(c) may be selected for a given period of time, and retransmission requests indicating packet loss may be received from each of the receiving devices 104(a)-(c) during the respective periods of time when they are selected to provide retransmission requests. The amount and characteristics of these retransmission requests may be analyzed to determine which receiving device 104(a)-(c) experiences the most packet loss and/or packet loss that most impacts sound quality. That device may be selected as the receiving device 104(a) to send retransmission requests for subsequent content data sent by the data distribution device 102. This process may be repeated when changes to the environment occur, such as when a new device is added to the environment, a device is removed from the environment, an internet configuration of the environment changes, device locations change, etc. In addition to the above, one or more machine learning models may be trained to determine factors that impact packet loss and/or to determine how to weight the factors described above. These factors and/or weightings indicated by the trained machine learning models may be utilized to select a given receiving device 104(a)-(d) that is to send retransmission requests.

In addition to the above, the grouping component 132 may be configured to determine whether receiving devices 104(a)-(d) should be grouped to most optimally minimize airtime while mitigating packet loss. For example, feedback data may indicate that packet loss differs between a first set of devices and a second set of devices. In these examples, the sets of devices may be grouped separately and a first transmission may be sent to a first group of the receiving devices 104(a)-(d) while a second transmission may be sent to a second group of the receiving devices 104(a)-(d). While this process requires two transmissions, and thus adds airtime, the process also better aligns backup packet generation with packet loss experienced by the multiple groups. Additionally, when more than one receiving device 104(a)-(d) is not configured to receive the transmissions described herein, those noncompliant devices may be grouped together while the compliant receiving devices may be grouped together in a separate group. In this example, the transmission protocols described herein may be utilized for the compliant group of devices, while a multicast transmission of the original content data and any backup packets as determined from the compliant group may be utilized for the noncompliant group. By doing so, in examples, only a single compliant receiving device 104(a) may be needed to achieve the benefits of the transmission protocol across all receiving devices 104(a)-(d) in an environment.

Additionally, or alternatively, in certain examples only a subset of available receiving devices 104(a)-(d) may be selected to receive content data. Take for example an environment that includes five receiving devices, but where only four of the receiving devices are selected to receive the content data for content output. In certain examples, at least one of the four receiving devices is configured to utilize the transmission protocol described herein. In this example, that receiving device may be selected for retransmission request sending as described herein. However, in other examples, none of the four receiving devices may be configured to receive and process the transmissions. In these examples, a "silent node" may be established. The silent node may be a receiving device, here the fifth receiving device, that is configured to utilize the transmission protocol but that can be configured to not output the content received at the device. In this example, the silent node may determine packet loss and send retransmission requests as described herein without outputting content representing the content data received at the silent node. Those retransmission requests may be utilized by the data distribution device 102 to generate and send backup packets to the four other receiving devices to mitigate packet loss while also not outputting the content on a device that was not selected to output such content.

In addition to the above, the forward erasure correction (FEC) component 128 may be utilized to introduce an FEC scheme for packet reconstruction when packets are lost. For example, the FEC scheme may include appending or otherwise including data from other packets in a given packet and/or duplicating packets such that attempts to reconstruct loss packets may be made at a receiving device, and/or the FEC scheme may include appending or otherwise including data representing a combination of data from multiple packets. In examples, the FEC component 128 may be configured to receive the retransmission requests from the receiving devices 104(a)-(d) and to utilize the retransmission requests to determine which packets were lost at the selected receiving device 104(a) and how to generate and send backup packets.

Once the data distribution device 102 determines that data packets are to be generated for sending to the receiving devices 104(a)-(d), the packet generator 126 may be configured to generate the packets. The packet generator 126 may generate packets that include a header as discuss herein as well as a payload including portions of the data to be sent to the receiving devices 104(a)-(d). When generating the data packets, the FEC component 128 may be utilized to control errors in data transmission between the data distribution device 102 and the receiving devices 104(a)-(d).

At the receiving devices 104(a)-(d), the retransmission component 144 may be configured to determine when data packets sent from the data distribution device 102 are lost and thus when to send retransmission requests back to the data distribution device 102. When backup packets are sent to the receiving devices 104(a)-(d) from the data distribution device 102, the recovery component 146 may be configured to receive the backup packets and to utilize those backup packets in place of the lost packets to mitigate the consequences of the lost packets. In examples where the backup packets include packet representations, the recovery component 146 may be configured to deconstruct or otherwise analyze the packet representations to reconstruct the lost packets.

The feedback component 150 of the system 106 may be utilized to receive packet-loss data from one or more sources, such as from the receiving devices 104(a)-(d) and/or from the system 106. For example, the receiving devices 104(a)-(d) may determine which packets are lost from the data distribution device 102. By way of example, each packet may be consecutively numbered and data indicating that numbering may be included in the header portion of the packets. The receiving devices 104(a)-(d) may utilize that data to determine an ordering of the packets, such as for correct output of audio when the content data includes audio data. If a packet is lost and/or is not received in time to be utilized for output by the receiving devices 104(a)-(d), the receiving devices 104(a)-(d) may determine that the received packets do not include at least one of the consecutively-numbered packets. This packet-loss data may be sent to the data distribution device 102 and/or the system 106, which may utilize this information to select backup packet configurations, for selecting which receiving device is to provide retransmission requests, etc.

It should be noted that while text data is described as a type of data utilized to communicate between various components of the system 106 and/or other systems and/or devices, the components of the system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102, 104(a)-(d).

As shown in FIG. 1, several of the components of the system 106 and the associated functionality of those components as described herein may be performed by one or more of the data distribution devices 102 and/or the receiving devices 104(a)-(d). Additionally, or alternatively, some or all of the components and/or functionalities associated with the data distribution devices 102 and/or receiving devices 104(a)-(d) may be performed by the system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110, 134, and/or the processor(s) described with respect to the components of the system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 134, and/or the processor(s) described with respect to the components of the system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110, 134, and/or the processor(s) described with respect to the components of the remote system 106 may possess its own local memory, which also may store program components, program data, and/or one or more operating systems.

The memory 114, 138, and/or the memory described with respect to the components of the system 106 may include volatile and nonvolatile memory, removable and non-removable media implemented in any method or technology for storage of information, such as computer-readable instructions, data structures, program component, or other data. Such memory 114, 138, and/or the memory described with respect to the components of the system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114, 138, and/or the memory described with respect to the components of the system 106 may be implemented as computer-readable storage media ("CRSM"), which may be any available physical media accessible by the processor(s) 110, 134, and/or the processor(s) described with respect to the system 106 to execute instructions stored on the memory 114, 138, and/or the memory described with respect to the components of the remote 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 138, and/or the memory described with respect to the components of the system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

The network interface(s) 112, 136, and/or the network interface(s) described with respect to the components of the system 106 may enable messages between the components and/or devices shown in system 100 and/or with one or more other polling systems, as well as other networked devices. Such network interface(s) 112, 136, and/or the network interface(s) described with respect to the components of the system 106 may include one or more network interface controllers (NICs) or other types of transceiver devices to send and receive messages over the network 108.

For instance, each of the network interface(s) 112, 136, and/or the network interface(s) described with respect to the components of the system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112, 136, and/or the network interface(s) described with respect to the components of the system 106 may include a wide area network (WAN) component to enable message over a wide area network.

In some instances, the system 106 may be local to an environment associated the data distribution devices 102 and/or receiving devices 104(a)-(d). For instance, the system 106 may be located within one or more of the data distribution devices 102 and/or receiving devices 104(a)-(d). In some instances, some or all of the functionality of the system 106 may be performed by one or more of the data distribution devices 102 and/or receiving devices 104(a)-(d). Also, while various components of the system 106 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device in a home and/or office environment, a self-driving automobile, a bus, an airplane, a camper, a trailer, and/or other similar object having a computer to perform its own sensor processing, etc.

Figure 2:
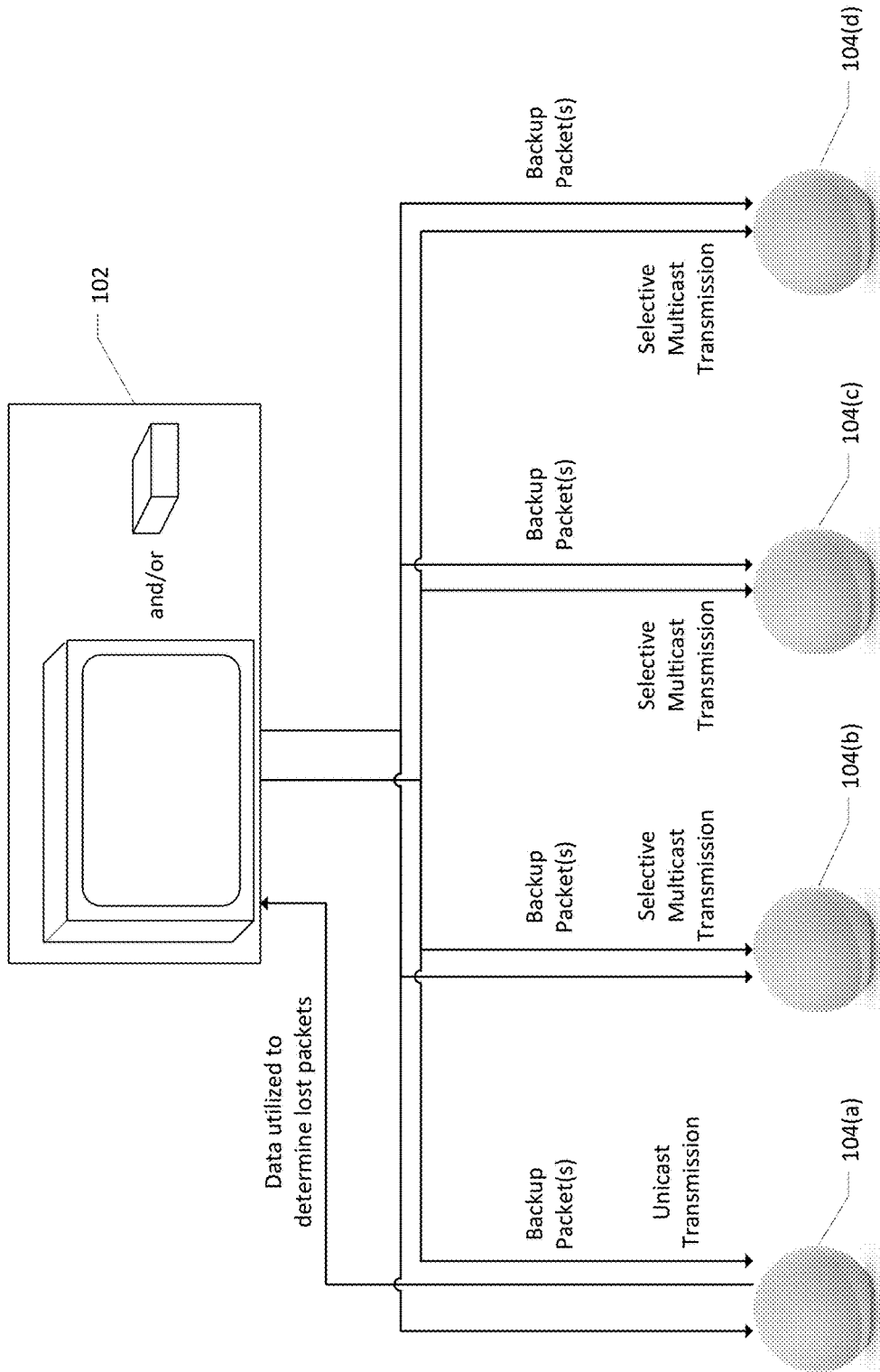
FIG. 2 illustrates a conceptual diagram of transmission protocols utilized to send content data from a data distribution device to multiple receiving devices.

FIG. 2 illustrates a conceptual diagram of transmission protocols utilized to send content data from a data distribution device to multiple receiving devices. The environment of FIG. 2 may include the same or similar devices and components as described with respect to FIG. 1. For example, FIG. 2 may include a data distribution device 102 and one or more receiving devices 104(a)-(d). These devices may include the same or similar components as described with respect to FIG. 1. FIG. 2 illustrates a first data transmission protocol. This first data transmission protocol includes the data distribution device 102 being configured to send a single unicast transmission to a selected receiving device such that the selected receiving device receives and processes the unicast transmission as a unicast transmission, and such that the other receiving devices receive and process the unicast transmission as a multicast transmission. It should be understood that the data distribution device 102 may be a device with a screen and/or speakers that is configured to output image data and/or audio data, and/or the data distribution device 102 may not include a screen and/or a speaker and may be configured to send content data to one or more other devices to output images and/or audio.

For example, a device selector of the data distribution device 102 may be configured to utilize the configuration data to select one of the receiving devices 104(a)-(d) to send retransmission requests in response to determining that packets have been lost. In this example, the data distribution device 102 may be configured to send a unicast transmission to the selected receiving device 104(a). By doing so, generally, the selected receiving device 104(a) may receive the unicast transmission and may be configured to process the unicast transmission. Additionally, the other receiving devices 104(b)-(d) may also be configured to process the unicast transmission sent to the selected receiving device 104(a) even though it is a unicast transmission that was not sent specifically to the other receiving devices 104(b)-(d). To do so, the wireless chipsets and/or other components of the other receiving devices 104(b)-(d) may be configured to determine whether the data packets sent using the unicast transmission include predetermined data, such as a predetermined IP address, preamble, QoS information, etc. indicating that the other receiving devices 104(b)-(d) are to treat the unicast transmission as a multicast transmission sent to those devices. As shown in FIG. 2, the unicast transmission is treated as a selective multicast transmission to the other receiving devices 104(b)-(d).

By so doing, the other receiving devices 104(b)-(d) may be configured to "listen in" to the unicast transmission sent to the selected device 104(a) and to process the data packets as a multicast transmission. In this example, the data distribution device 102 sends a single transmission, the unicast transmission, that is received and processed on the selected receiving device 104(*a*) as a unicast transmission and is received and processed on the other receiving devices 104 (*b*)-(*d*) as a multicast transmission. The selected receiving device 104(*a*), which receives the content data as a unicast transmission, sends retransmission requests indicating packet loss at the selected receiving device 104(*a*) to the data distribution device 102. The data distribution device 102 utilizes those retransmission requests to generate backup packets, which may also be sent utilizing the unicast transmission to the selected receiving device 104(*a*). Again, the backup packets may include the predetermined data that allows the other receiving devices 104(*b*)-(*d*) to receive and process the backup packets. By so doing, packet loss across the receiving devices 104(*a*)-(*d*) is mitigated while airtime of sending the content data is minimized.

Figure 3:
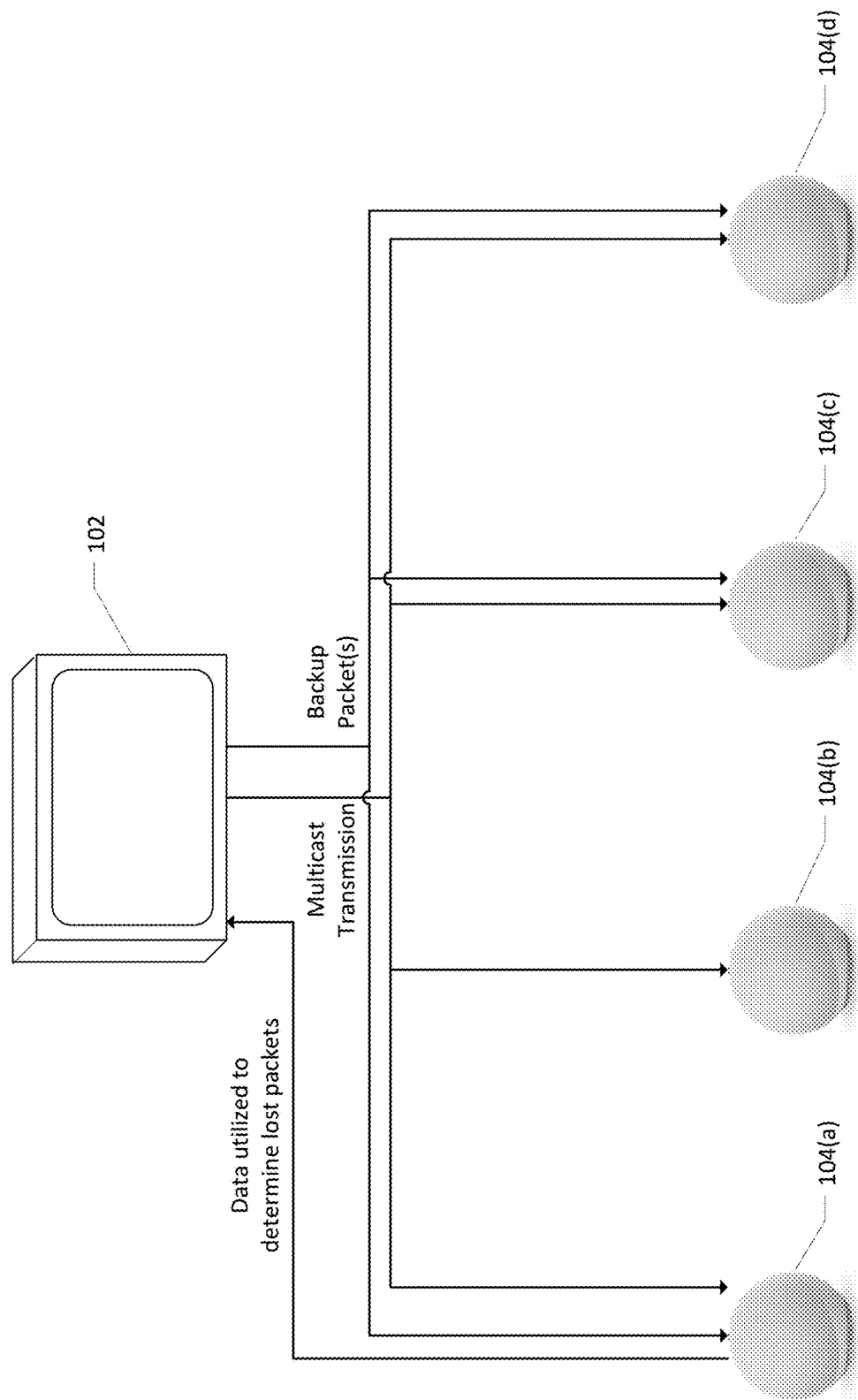
FIG. 3 illustrates a conceptual diagram of other transmission protocols utilized to send content data from a data distribution device to multiple receiving devices.

FIG. 3 illustrates a conceptual diagram of other transmission protocols utilized to send content data from a data distribution device to multiple receiving devices. The environment of FIG. 3 may include the same or similar devices and components as described with respect to FIG. 1. For example, FIG. 3 may include a data distribution device 102 and one or more receiving devices 104(*a*)-(*d*). These devices may include the same or similar components as described with respect to FIG. 1. FIG. 3 illustrates a second data transmission protocol that differs from the first data transmission protocol described with respect to FIG. 2. This second data transmission protocol includes the data distribution device 102 being configured to send a single multi transmission to all of the receiving devices while configuring a selected receiving device to treat the multicast transmission as a unicast transmission such that the selected receiving device sends retransmission requests indicating packet loss to the data distribution device.

For example, instead of the data distribution device 102 sending a unicast transmission to a selected receiving device 104(*a*), the data distribution device 102 may send one multicast transmission to all of the receiving devices 104 (*a*)-(*d*), and may send a command and/or other information to one of the receiving devices 104(*a*) that causes that receiving device 104(*a*) to treat the multicast transmission as a unicast transmission for the purpose of sending retransmission requests back to the data distribution device 102. For example, the device selector may select one of the receiving devices 104(*a*)-(*d*) as described herein. The data distribution device 102 may send, prior to sending the content data, a command to the selected receiving device 104(*a*) indicating that the receiving device 104(*a*) is to treat received content data as a unicast transmission even if the content data is received as a multicast transmission.

In other examples, when the data distribution device 102 sends the content data as the multicast transmission, the header of the sent data packets may be configured to include predetermined data that indicates the selected receiving device 104(*a*) is to treat the multicast transmission as a unicast transmission. The selected receiving device 104(*a*) may then send retransmission requests back to the data distribution device 102 for backup packet generation as described herein. By so doing, the data distribution device 102 may send a single multicast transmission to all of the receiving devices 104(*a*)-(*d*) to minimize airtime while still mitigating packet loss as determined by the selected receiving device 104(*a*).

Figure 4:
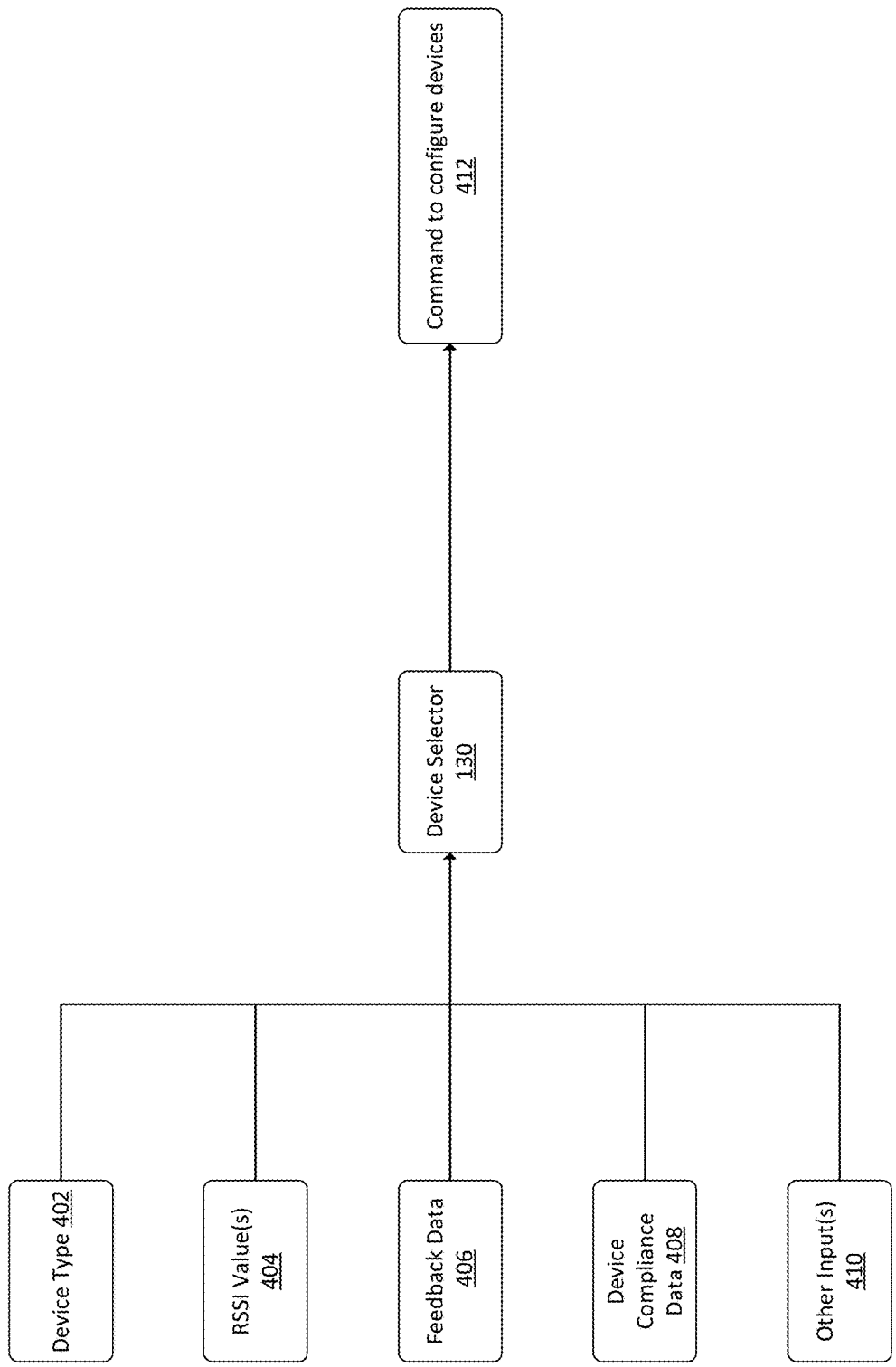
FIG. 4 illustrates a conceptual diagram of example data types utilized to select one of multiple receiving devices to send data utilized to determine packet loss to a data distribution device.

FIG. 4 illustrates a conceptual diagram of example data types utilized to select one of multiple receiving devices to send retransmission requests to a data distribution device. FIG. 4 may include the same or similar components as described with respect to FIG. 1. For example, FIG. 4 may include a device selector 130. Additionally, FIG. 4 may include various types of configuration data associated with receiving devices, such as the receiving devices 104(*a*)-(*d*) described with respect to FIG. 1. The device selector 130 may be configured to receive some or all of this configuration data to determine which receiving device is to be selected to send retransmission requests as described herein.

For example, a data distribution device may query the receiving devices, either on the fly or prior to a request to output content by a user, for information indicating a configuration of the receiving devices. The device selector 130 may be configured to determine, from the configuration data, which receiving device is most likely to have associated lost packets and/or that is most likely to have the greatest amount of lost packets. To do so, the device selector 130 may be configured to utilize one or more data types to determine which receiving device to select. The data types may include any or all of the configuration data described herein, including device type data 402, RSSI values 404, feedback data 406, device compliance data 408, and/or other inputs 410 including inputs indicated as relevant for packet loss by one or more machine learning models.

For example, the device type data 402 may indicate frequency ranges that a given receiving device is configured to output audio in. In these examples, a subwoofer device may be configured to output audio at a first frequency range, while a tweeter device or other device may be configured to output audio at a second frequency range that is higher than the subwoofer device. Generally, packet loss at the subwoofer device may result in impaired sound quality that is less noticeable to the human ear than packet loss at devices that output audio at higher frequency ranges. As such, the receiving device that outputs audio at higher frequency ranges may be selected instead of a subwoofer device. Additionally, the RSSI values 404 may be utilized to determine distances between the data distribution device and the receiving devices in an environment, and/or to which devices receive the most signal impedance based on their location in an environment with respect to other devices and objects of the environment. In these examples, the receiving device with the lowest RSSI values 404 is likely to experience the most packet loss from the data distribution device, and as such may be selected to send retransmission requests. Additionally, the device compliance data 408 may indicate which of the receiving devices is not configured to receive the transmissions described herein, or otherwise does not include wireless chipsets and/or other components that are configured to process received content data as described herein. By way of example, if one of the receiving devices is not configured to receive the transmissions but the other receiving devices are so configured, the receiving device not configured to receive the transmissions may be selected and a unicast transmission may be sent to that device.

In addition to the above, or alternatively, a feedback process may be initiated to determine the feedback data 406 and to utilize that feedback data 406 to determine which receiving device to select as described herein. Take for example an environment that includes three receiving devices. Each of the three receiving devices may be selected for a given period of time, and retransmission requests indicating packet loss may be received from each of the receiving devices during the respective periods of time when they are selected to provide retransmission requests. The amount and characteristics of these retransmission requests may be analyzed to determine which receiving device experiences the most packet loss and/or packet loss that most impacts sound quality. That device may be selected as the receiving device to send retransmission requests for subsequent content data sent by the data distribution device. This process may be repeated when changes to the environment occur, such as when a new device is added to the environment, a device is removed from the environment, an internet configuration of the environment changes, device locations change, etc. Once a receiving device is selected as described above, the data distribution device may generate and send a command 412 to the selected receiving device to configure it to send retransmission requests as described herein. The data distribution device may also send a command 412 to the other receiving devices to cause them to process content data sent to the selected receiving device using a unicast transmission.

In addition to the above, one or more machine learning models may be trained to determine factors or otherwise inputs 410 that impact packet loss and/or to determine how to weight the factors described above. These factors and/or weightings indicated by the trained machine learning models may be utilized to select a given receiving device that is to send retransmission requests. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with the feedback data. The models may be trained for multiple user accounts and/or for a specific user account. As such, the machine learning models may be configured to learn, without human intervention, attributes of collected feedback data that are more likely and/or less likely to indicate packet loss and/or which receiving device is best positioned to send transmission requests as described herein.

Figure 5:
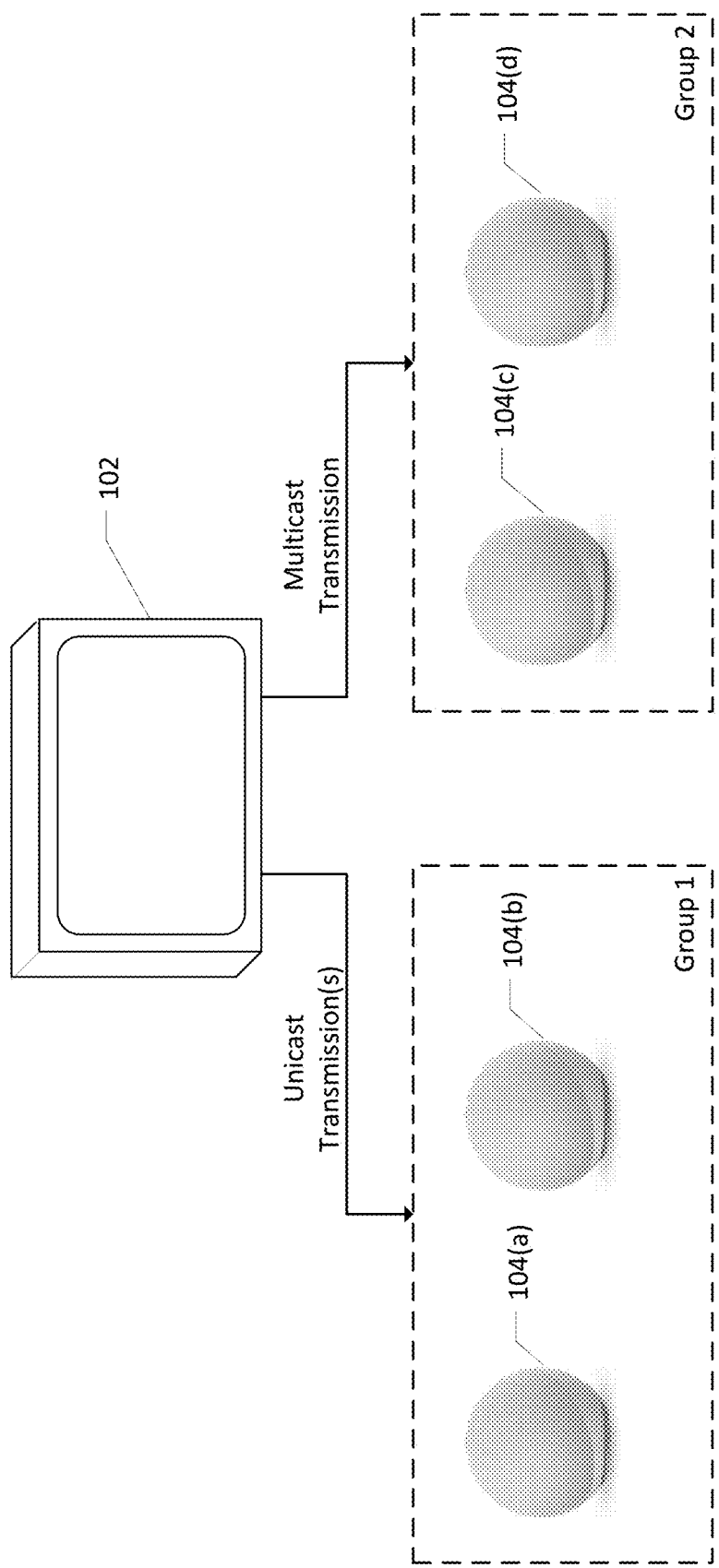
FIG. 5 illustrates a conceptual diagram of grouping receiving devices to limit data sending airtime by a data distribution device.

FIG. 5 illustrates a conceptual diagram of grouping receiving devices to limit data sending bandwidth use by a data distribution device. The environment of FIG. 5 may include the same or similar devices and components as described with respect to FIG. 1. For example, FIG. 5 may include a data distribution device 102 and one or more receiving devices 104(a)-(d). These devices may include the same or similar components as described with respect to FIG. 1. FIG. 4 illustrates a data transmission protocol utilized when receiving devices are grouped.

For example, a grouping component of a data distribution device may be configured to determine whether receiving devices should be grouped to most optimally minimize airtime while mitigating packet loss. For example, feedback data may indicate that packet loss differs between a first set of devices, noted as Group 1 in FIG. 5, and a second set of devices, noted as Group 2 in FIG. 5. In these examples, the sets of devices may be grouped separately and a first transmission may be sent to a first group of the receiving devices 104(a)-(d) while a second transmission may be sent to a second group of the receiving devices 104(a)-(d). While this process requires two transmissions, and thus adds airtime, the process also better aligns backup packet generation with packet loss experienced by the multiple groups. Additionally, when more than one receiving device 104(a)-(d) is not configured to receive the transmissions described herein, those noncompliant devices may be grouped together while the compliant receiving devices may be grouped together in a separate group. In this example, the transmission protocols described herein may be utilized for the compliant group of devices, while a multicast transmission of the original content data and any backup packets as determined from the compliant group may be utilized for the noncompliant group.

Using FIG. 5 as an example, the receiving devices 104(a)-(b) in Group 1 may have been determined to be compliant devices or are otherwise devices with wireless chipsets and/or other components that allow those devices to treat unicast transmissions as multicast transmissions and to treat multicast transmissions as unicast transmissions when directed to do so. The receiving devices 104(c)-(d) in Group 2 may have been determined to be noncompliant devices or are otherwise devices with wireless chips that do not allow for the processing of unicast transmissions as multicast transmissions and vice versa. Given that multiple receiving devices 104(c)-(d) cannot process the transmissions described herein, without grouping, a unicast transmission would need to be sent to each of the noncompliant devices. Instead, the grouping component of the data distribution device may be configured to group the noncompliant devices together and to group the compliant devices together. By doing so, a single unicast transmission may be sent to one of the compliant devices to determine retransmission requests indicating packet loss, while a multicast transmission may be sent to the noncompliant device group that includes the original packets as well as any backup packets determined from the retransmission request from the compliant group. It should be understood that one or more than one unicast transmissions may be sent to the devices in Group 1.

Additionally, or alternatively, in certain examples only a subset of available receiving devices 104(*a*)-(*d*) may be selected to receive content data. Take for example an environment that includes five receiving devices, but where only four of the receiving devices are selected to receive the content data for content output. In certain examples, at least one of the four receiving devices is configured to utilize the transmission protocol described herein. In this example, that receiving device may be selected for retransmission request sending as described herein. However, in other examples, none of the four receiving devices may be configured to receive and process the transmissions. In these examples, a "silent node" may be established. The silent node may be a receiving device, here the fifth receiving device, that is configured to utilize the transmission protocol but that can be configured to not output the content received at the device. In this example, the silent node may determine packet loss and send retransmission requests as described herein without outputting content representing the content data received at the silent node. Those retransmission requests may be utilized by the data distribution device to generate and send backup packets to the four other receiving devices to mitigate packet loss while also not outputting the content on a device that was not selected to output such content.

Figure 6:
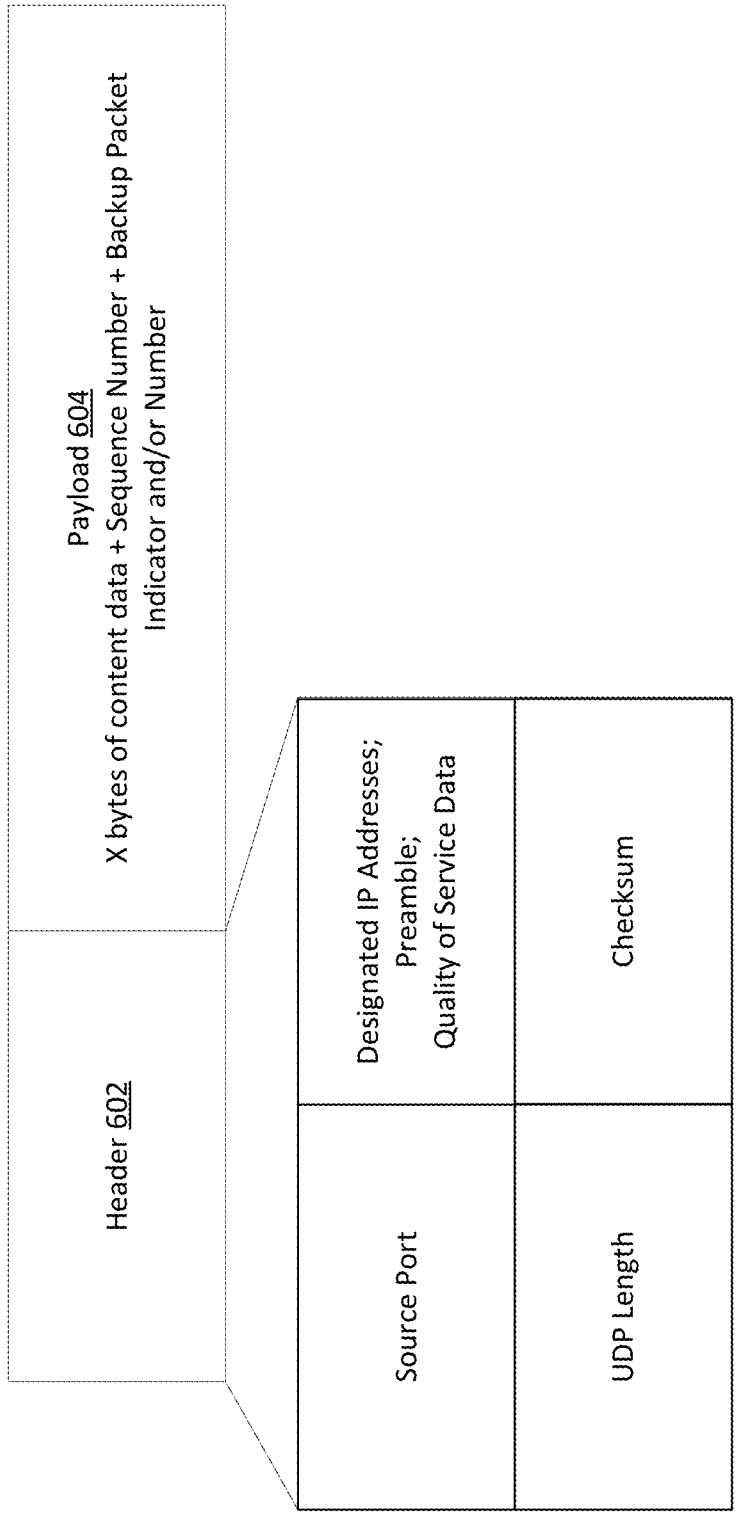
FIG. 6 illustrates a conceptual diagram of an example data packet utilized for data transmission protocols.

FIG. 6 illustrates a conceptual diagram of an example data packet utilized for data transmission protocols.

A given data packet may include a header 602 and a payload 604. The header 602 may include control information and the payload 604 may include the content data to be transmitted between devices as well as packet representations and/or backup packet data as described more fully herein. The control information of the header 602 may include information such as source port information, destination port information, UDP length, and a checksum. Additionally, the header 602 may be utilized to send the predetermined data as described herein to cause a given device to process a unicast transmission as a multicast transmission, or to cause a given device to process a multicast transmission as a unicast transmission. That predetermined data may include a predetermined IP address, information provided in a preamble of the header, QoS information, and/or any other information that may indicate to the device that it is to process the content data in the payment 604.

The payload 604 may include bytes of the content data to be sent from a sending device to a receiving device. The transmission unit size of the data packets may be utilized to determine how to split up the content data between packets and how many packets are to be sent. As described herein, the payload 604 may also include packet representations of two other packets, which may include data generated utilizing an exclusive disjunctive function by a FEC component and appended to the content data. In examples, the data may be the same or a similar length as the content data. In these examples, the size of the payload 604 of the packet may double in size and/or the payload size may remain the same but the amount of content data may be reduced by approximately half. The payload 604 may also include a sequence number for the packet at issue as well as other data such as data indicating a length of the audio data, length of packet representations, and/or other data that may assist in sharing the details of the payload. When a backup packet is sent, as described herein, the header 602 and/or the payload 604 may indicate that the packet is a backup packet and may indicate the sequence number of the lost packet to which the backup packet corresponds. In examples, a backup packet indicator and/or backup packet number may be included in the payload 604 and/or the header 602.

FIGS. 7-10 illustrate processes for data transmission protocols. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6 and 11-15, although the processes may be implemented in a wide variety of other environments, architectures and systems.

Figure 7:
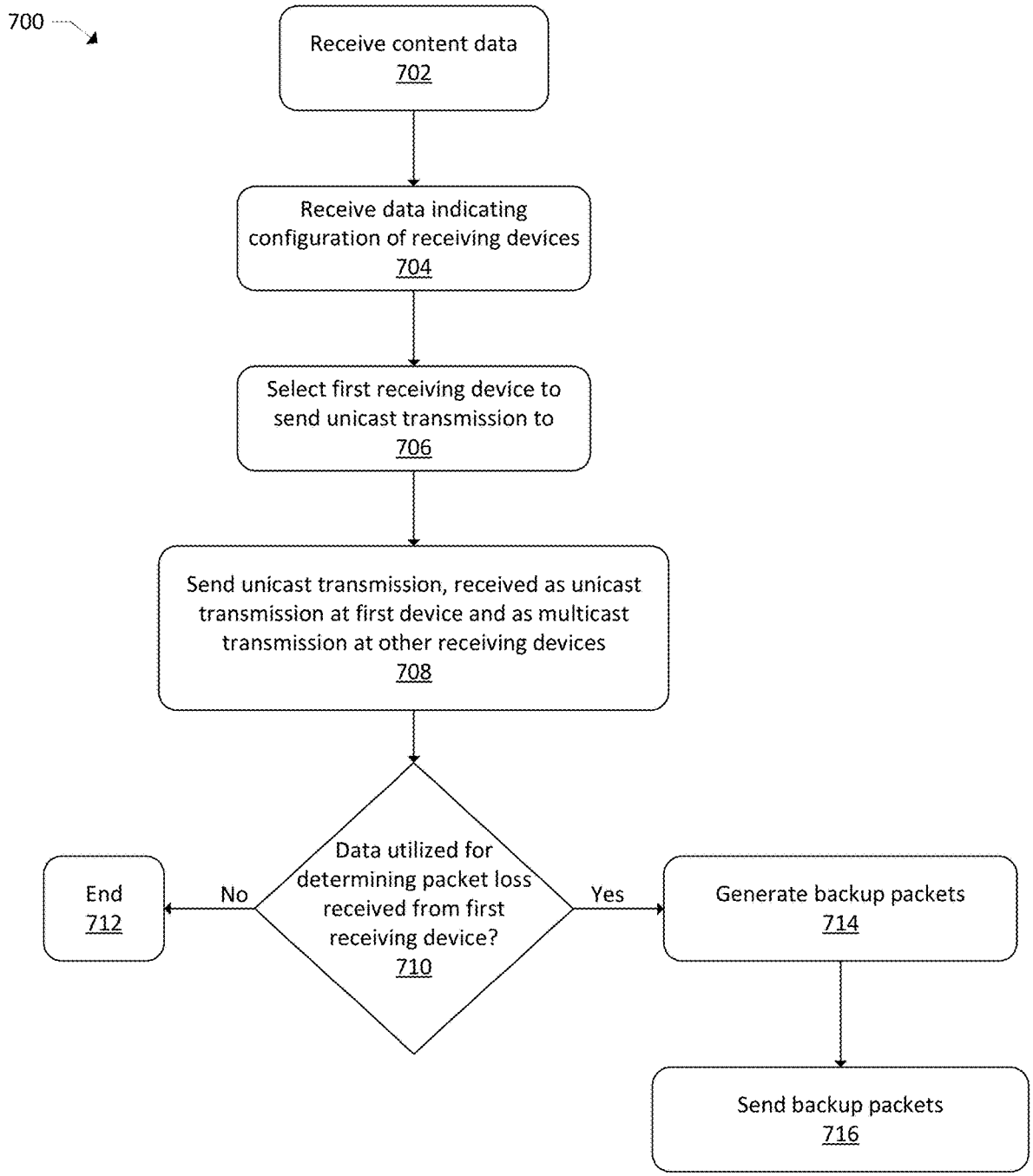
FIG. 7 illustrates a flow diagram of an example process for utilizing a first data transmission protocol.

FIG. 7 illustrates a flow diagram of an example process 700 for utilizing a first data transmission protocol. The order in which the operations or steps are described is not intended to be construed as a limitation, and any number of the described operations may be combined in any order and/or in parallel to implement process 700.

At block 702, the process 700 may include receiving content data. For example, a content component of the data distribution device may be configured to receive content data from one or more sources, such as from another component of a system associated with the data distribution device. In examples, a user may request content be output on the one or more devices associated with a given environment. The data distribution device and/or another device in the environment may receive user input indicating this request, and corresponding user input data may be sent to a system, such as a content provider. The system may send the content data to the data distribution device, which may initiate a process for providing at least a portion of the content data to the one or more receiving devices. By way of example, the data distribution device may determine that it is to output images corresponding to an image data portion of the content data while receiving devices, say four receiving devices by way of example, are to output an audio data portion of the content data. In this example, the data distribution device may be configured to send data packets representing the audio data to the four receiving devices.

At block 704, the process 700 may include receiving data indicating configurations of receiving devices. For example, a configuration component may be configured to determine a configuration of the receiving devices. For example, a data distribution device may query the receiving devices, either on the fly or prior to the request to output content by the user, for information indicating a configuration of the receiving devices. This configuration data may include an identifier of a given receiving device, a manufacturer of the receiving device, audio output capabilities, RSSI data, etc. Additionally, the configuration data may indicate whether a given receiving device has been configured to receive content data utilizing the transmission protocols described herein. For example, as explained in more detail below, the transmission protocols described herein may require hardware, firmware, and/or software of the receiving devices to be configured in a certain way. For example, a wireless chipset and/or another component of a given receiving device may be configured to receive and process data packets sent to a predetermined IP address that differs from typically-used IP addresses for unicast transmissions. In other examples, the wireless chipset and/or the other component of a given receiving device may be configured to process data packets that include certain information in, for example, a header portion of the packet. This information may include predetermined QoS information, predetermined device identifier information, a predetermined preamble in the header, etc. The configuration data may indicate whether the receiving devices are configured to utilize this information to process received data packets.

At block 706, the process 700 may include selecting a first receiving device to send a unicast transmission to. For example, a device selector may be configured to select a receiving device that is most likely to have associated lost packets and/or that is most likely to have the greatest amount of lost packets. To do so, the device selector may be configured to utilize one or more data types to determine which receiving device to select. The data types may include any or all of the configuration data described above, including device types, RSSI values, feedback data, device compliance data, and/or other inputs including inputs indicated as relevant for packet loss by one or more machine learning models. For example, the device type data may indicate frequency ranges that a given receiving device is configured to output audio in. In these examples, a subwoofer device may be configured to output audio at a first frequency range, while a tweeter device or other device may be configured to output audio at a second frequency range that is higher than the subwoofer device. Generally, packet loss at the subwoofer device may result in impaired sound quality that is less noticeable to the human ear than packet loss at devices that output audio at higher frequency ranges. As such, the receiving device that outputs audio at higher frequency ranges may be selected instead of a subwoofer device. Additionally, the RSSI values may be utilized to determine distances between the data distribution device and the receiving devices in an environment, and/or to which devices receive the most signal impedance based on their location in an environment with respect to other devices and objects of the environment. In these examples, the receiving device with the lowest RSSI values is likely to experience the most packet loss from the data distribution device, and as such may be selected to send retransmission requests. Additionally, the device compliance data may indicate which of the receiving devices is not configured to receive the transmissions described herein, or otherwise does not include wireless chipsets and/or other components that are configured to process received content data as described herein. By way of example, if one of the receiving devices is not configured to receive the transmissions but the other receiving devices are so configured, the receiving device not configured to receive the transmissions may be selected and a unicast transmission may be sent to that device.

In addition to the above, or alternatively, a feedback process may be initiated to determine which receiving device to select as described herein. Take for example an environment that includes three receiving devices. Each of the three receiving devices may be selected for a given period of time, and retransmission requests indicating packet loss may be received from each of the receiving devices during the respective periods of time when they are selected to provide retransmission requests. The amount and characteristics of these retransmission requests may be analyzed to determine which receiving device experiences the most packet loss and/or packet loss that most impacts sound quality. That device may be selected as the receiving device to send retransmission requests for subsequent content data sent by the data distribution device. This process may be repeated when changes to the environment occur, such as when a new device is added to the environment, a device is removed from the environment, an internet configuration of the environment changes, device locations change, etc. In addition to the above, one or more machine learning models may be trained to determine factors that impact packet loss and/or to determine how to weight the factors described above. These factors and/or weightings indicated by the trained machine learning models may be utilized to select a given receiving device that is to send retransmission requests.

At block 708, the process 700 may include sending the unicast transmission, which may be received at the selected receiving device as a unicast transmission and may be received at other receiving devices as a multicast transmission. For example, data packets representing the content data may be generated and sent as a unicast transmission indicating an IP address of the selected device as well as a default IP address that may be utilized by the other receiving devices to cause those other receiving devices to process the unicast transmission as a multicast transmission. Data other than IP addresses may also be utilized, such as packet preamble data, QoS information, etc. as described herein.

At block 710, the process 100 may include determining whether data to be utilized to determine packet loss has been received from the selected receiving device. For example, when the selected receiving device determines that one or more packets have been lost, the selected receiving device may send one or more retransmission requests indicating that packets have been lost and indicating which packets have been lost and/or the receiving device may send packet acknowledgements that may be utilized to determine which packets were not received at the selected receiving device. It should be understood that, in examples, the lack of an acknowledgement from the receiving device, such as after a predetermined period of time has lapsed, may be interpreted as a retransmission request from the receiving device.

In examples where retransmission requests and/or other data utilized to determine packet loss are not received, this may indicate that no packet loss was detected at the selected receiving device and thus the sending of backup packets is not necessary. As such, the process 700 may end at block 712.

In examples where retransmission requests are received, the process 700 may include, at block 714, generating backup packets based at least in part on the retransmission requests. For example, the backup packets may include a payload that is similar to the lost data packet at issue, and in examples may indicate that the packet is a backup packet.

At block 716, the process 700 may include sending the backup packets, which may be received at the selected receiving device as a unicast transmission of the backup packets and which may be received at the other receiving devices as a multicast transmission of the backup packets. For example, the selected receiving device may expect to receive the backup packets based at least in part on the selected receiving device having sent the retransmission requests that indicated backup packets were needed due to packet loss. Additionally, while a receiving device that is receiving a multicast transmission would not typically receive backup packets, the inclusion of the predetermined data such as a predetermined IP address, preamble information, QoS information, etc. may cause the other receiving devices to process the backup packets. It should be understood that the backup packets may be sent utilizing a unicast transmission, a multicast transmission, and/or some of the backup packets may be sent utilizing a unicast transmission while other backup packets may be sent utilizing a multicast transmission.

Figure 8:
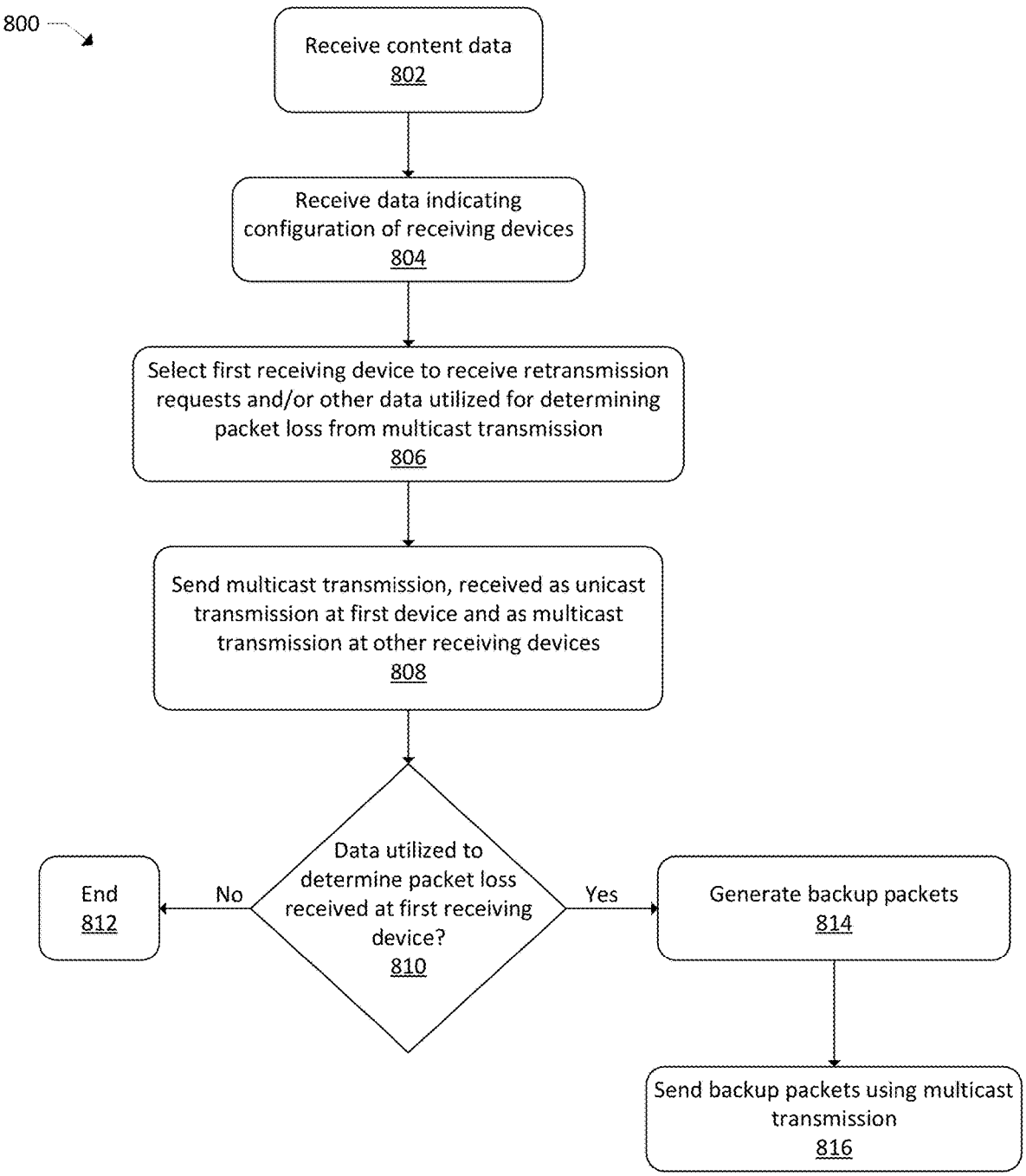
FIG. 8 illustrates a flow diagram of an example process for utilizing a second data transmission protocol.

FIG. 8 illustrates a flow diagram of an example process 800 for utilizing a second data transmission protocol. The order in which the operations or steps are described is not intended to be construed as a limitation, and any number of the described operations may be combined in any order and/or in parallel to implement process 800.

At block 802, the process 800 may include receiving content data. For example, a content component of the data distribution device may be configured to receive content data from one or more sources, such as from another component of a system associated with the data distribution device. In examples, a user may request content be output on the one or more devices associated with a given environment. The data distribution device and/or another device in the environment may receive user input indicating this request, and corresponding user input data may be sent to a system, such as a content provider. The system may send the content data to the data distribution device, which may initiate a process for providing at least a portion of the content data to the one or more receiving devices. By way of example, the data distribution device may determine that it is to output images corresponding to an image data portion of the content data while receiving devices, say four receiving devices by way of example, are to output an audio data portion of the content data. In this example, the data distribution device may be configured to send data packets representing the audio data to the four receiving devices.

At block 804, the process 800 may include receiving data indicating configurations of receiving devices. For example, a configuration component may be configured to determine a configuration of the receiving devices. For example, a data distribution device may query the receiving devices, either on the fly or prior to the request to output content by the user, for information indicating a configuration of the receiving devices. This configuration data may include an identifier of a given receiving device, a manufacturer of the receiving device, audio output capabilities, RSSI data, etc. Additionally, the configuration data may indicate whether a given receiving device has been configured to receive content data utilizing the transmission protocols described herein. For example, as explained in more detail below, the transmission protocols described herein may require hardware, firmware, and/or software of the receiving devices to be configured in a certain way. For example, a wireless chipset and/or another component of a given receiving device may be configured to receive and process data packets sent to a predetermined IP address that differs from typically-used IP addresses for unicast transmissions. In other examples, the wireless chipset and/or another component of a given receiving device may be configured to process data packets that include certain information in, for example, a header portion of the packet. This information may include predetermined QoS information, predetermined device identifier information, a predetermined preamble in the header, etc. The configuration data may indicate whether the receiving devices are configured to utilize this information to process received data packets.

At block 806, the process 800 may include selecting a first receiving device to receive retransmission requests from in response to a multicast transmission. For example, a device selector may be configured to select a receiving device that is most likely to have associated lost packets and/or that is most likely to have the greatest amount of lost packets. To do so, the device selector may be configured to utilize one or more data types to determine which receiving device to select. The data types may include any or all of the configuration data described above, including device types, RSSI values, feedback data, device compliance data, and/or other inputs including inputs indicated as relevant for packet loss by one or more machine learning models. For example, the device type data may indicate frequency ranges that a given receiving device is configured to output audio in. In these examples, a subwoofer device may be configured to output audio at a first frequency range, while a tweeter device or other device may be configured to output audio at a second frequency range that is higher than the subwoofer device. Generally, packet loss at the subwoofer device may result in impaired sound quality that is less noticeable to the human ear than packet loss at devices that output audio at higher frequency ranges. As such, the receiving device that outputs audio at higher frequency ranges may be selected instead of a subwoofer device. Additionally, the RSSI values may be utilized to determine distances between the data distribution device and the receiving devices in an environment, and/or to which devices receive the most signal impedance based on their location in an environment with respect to other devices and objects of the environment. In these examples, the receiving device with the lowest RSSI values is likely to experience the most packet loss from the data distribution device, and as such may be selected to send retransmission requests. Additionally, the device compliance data may indicate which of the receiving devices is not configured to receive the transmissions described herein, or otherwise does not include wireless chipsets and/or other components that are configured to process received content data as described herein. By way of example, if one of the receiving devices is not configured to receive the transmissions but the other receiving devices are so configured, the receiving device not configured to receive the transmissions may be selected and a unicast transmission may be sent to that device.

In addition to the above, or alternatively, a feedback process may be initiated to determine which receiving device to select as described herein. Take for example an environment that includes three receiving devices. Each of the three receiving devices may be selected for a given period of time, and retransmission requests indicating packet loss may be received from each of the receiving devices during the respective periods of time when they are selected to provide retransmission requests. The amount and characteristics of these retransmission requests may be analyzed to determine which receiving device experiences the most packet loss and/or packet loss that most impacts sound quality. That device may be selected as the receiving device to send retransmission requests for subsequent content data sent by the data distribution device. This process may be repeated when changes to the environment occur, such as when a new device is added to the environment, a device is removed from the environment, an internet configuration of the environment changes, device locations change, etc. In addition to the above, one or more machine learning models may be trained to determine factors that impact packet loss and/or to determine how to weight the factors described above. These factors and/or weightings indicated by the trained machine learning models may be utilized to select a given receiving device that is to send retransmission requests.

At block 808, the process 800 may include sending a multicast transmission, which may be received as a unicast transmission at the selected receiving device and which may be received as the multicast transmission at the other receiving devices. In this example, the multicast transmission may include one or more IP addresses and/or other data in sent data packets that may cause the receiving devices to process the data packets as a multicast transmission. Additionally, the multicast transmission may include a predetermined IP address or other data that may be received at the selected receiving device that may cause the selected receiving device to process the multicast transmission as a unicast transmission.

At block 810, the process 800 may include determining whether data utilized to determine packet loss has been received from the selected receiving device. For example, when the selected receiving device determines that one or more packets have been lost, the selected receiving device may send one or more retransmission requests indicating that packets have been lost and indicating which packets have been lost.

In examples where retransmission requests are not received, this may indicate that no packet loss was detected at the selected receiving device and thus the sending of backup packets is not necessary. As such, the process 800 may end at block 812.

In examples where retransmission requests are received, the process 800 may include, at block 814, generating backup packets based at least in part on the retransmission requests. For example, the backup packets may include a payload that is similar to the lost data packet at issue, and in examples may indicate that the packet is a backup packet.

At block 816, the process 800 may include sending the backup packets using a multicast transmission to the selected receiving device and the other receiving devices. For example, the selected receiving device may expect to receive the backup packets based at least in part on the selected receiving device having sent the retransmission requests that indicated backup packets were needed due to packet loss. Additionally, while a receiving device that is receiving a multicast transmission would not typically receive backup packets, the inclusion of the predetermined data such as a predetermined IP address, preamble information, QoS information, etc. may cause the other receiving devices to process the backup packets.

Figure 9:
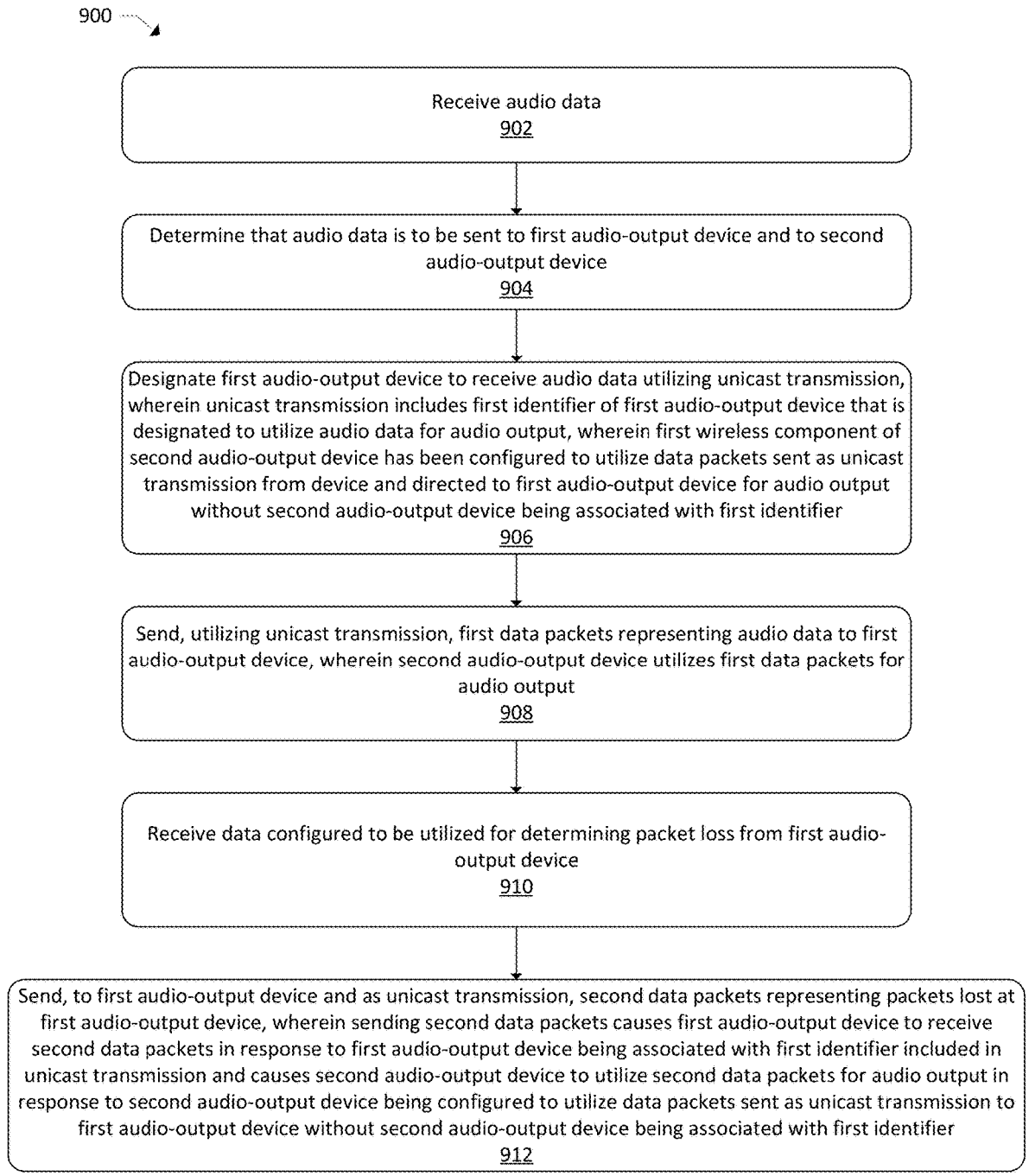
FIG. 9 illustrates a flow diagram of an example process for sending content data utilizing a data transmission protocol.

FIG. 9 illustrates a flow diagram of an example process 900 for sending content data utilizing a data transmission protocol. The order in which the operations or steps are described is not intended to be construed as a limitation, and any number of the described operations may be combined in any order and/or in parallel to implement process 900.

At block 902, the process 900 may include receiving audio data. For example, a content component of the data distribution device may be configured to receive content data from one or more sources, such as from another component of a system associated with the data distribution device. In examples, a user may request content be output on the one or more devices associated with a given environment. The data distribution device and/or another device in the environment may receive user input indicating this request, and corresponding user input data may be sent to a system, such as a content provider. The system may send the content data to the data distribution device, which may initiate a process for providing at least a portion of the content data to the one or more receiving devices. By way of example, the data distribution device may determine that it is to output images corresponding to an image data portion of the content data while receiving devices, say four receiving devices by way of example, are to output an audio data portion of the content data. In this example, the data distribution device may be configured to send data packets representing the audio data to the four receiving devices.

At block 904, the process 900 may include determining that the audio data is to be sent to a first audio-output device and to a second audio-output device. For example, the data distribution device may determine that the audio data is to be sent to more than one receiving device. It should be understood that while this example includes two audio-output devices, the data distribution device may determine that the content data is to be sent to one, two, or more receiving devices.

At block 906, the process 900 may include designating the first audio-output device to receive the audio data utilizing a unicast transmission, wherein the unicast transmission includes a first identifier of the first audio-output device that is designated to utilize the audio data for audio output, wherein a first wireless component of the second audio-output device has been configured to utilize data packets sent as the unicast transmission from the device and directed to the first audio-output device for the audio output without the second audio-output device being associated with the first identifier. For example, a device selector may be configured to select a receiving device that is most likely to have associated lost packets and/or that is most likely to have the greatest amount of lost packets. To do so, the device selector may be configured to utilize one or more data types to determine which receiving device to select. The data types may include any or all of the configuration data described above, including device types, RSSI values, feedback data, device compliance data, and/or other inputs including inputs indicated as relevant for packet loss by one or more machine learning models. For example, the device type data may indicate frequency ranges that a given receiving device is configured to output audio in. In these examples, a subwoofer device may be configured to output audio at a first frequency range, while a tweeter device or other device may be configured to output audio at a second frequency range that is higher than the subwoofer device. Generally, packet loss at the subwoofer device may result in impaired sound quality that is less noticeable to the human ear than packet loss at devices that output audio at higher frequency ranges. As such, the receiving device that outputs audio at higher frequency ranges may be selected instead of a subwoofer device. Additionally, the RSSI values may be utilized to determine distances between the data distribution device and the receiving devices in an environment, and/or to which devices receive the most signal impedance based on their location in an environment with respect to other devices and objects of the environment. In these examples, the receiving device with the lowest RSSI values is likely to experience the most packet loss from the data distribution device, and as such may be selected to send retransmission requests. Additionally, the device compliance data may indicate which of the receiving devices is not configured to receive the transmissions described herein, or otherwise does not include wireless chipsets and/or other components that are configured to process received content data as described herein. By way of example, if one of the receiving devices is not configured to receive the transmissions but the other receiving devices are so configured, the receiving device not configured to receive the transmissions may be selected and a unicast transmission may be sent to that device.

In addition to the above, or alternatively, a feedback process may be initiated to determine which receiving device to select as described herein. Take for example an environment that includes three receiving devices. Each of the three receiving devices may be selected for a given period of time, and retransmission requests indicating packet loss may be received from each of the receiving devices during the respective periods of time when they are selected to provide retransmission requests. The amount and characteristics of these retransmission requests may be analyzed to determine which receiving device experiences the most packet loss and/or packet loss that most impacts sound quality. That device may be selected as the receiving device to send retransmission requests for subsequent content data sent by the data distribution device. This process may be repeated when changes to the environment occur, such as when a new device is added to the environment, a device is removed from the environment, an internet configuration of the environment changes, device locations change, etc. In addition to the above, one or more machine learning models may be trained to determine factors that impact packet loss and/or to determine how to weight the factors described above. These factors and/or weightings indicated by the trained machine learning models may be utilized to select a given receiving device that is to send retransmission requests.

At block 908, the process 900 may include sending, utilizing the unicast transmission, first data packets representing the audio data to the first audio-output device, wherein the second audio-output device utilizes the first data packets for the audio output. For example, data packets representing the content data may be generated and sent as a unicast transmission indicating an IP address of the selected device as well as a default IP address that may be utilized by the other receiving devices to cause those other receiving devices to process the unicast transmission as a multicast transmission. Data other than IP addresses may also be utilized, such as packet preamble data, QoS information, etc. as described herein.

At block 910, the process 900 may include receiving data configured to be utilized for determining packet loss from the first audio-output device. For example, when the selected receiving device determines that one or more packets have been lost, the selected receiving device may send one or more retransmission requests indicating that packets have been lost and indicating which packets have been lost.

At block 912, the process 900 may include sending, to the first audio-output device and as the unicast transmission, second data packets representing the packets lost at the first audio-output device, wherein sending the second data packets causes the first audio-output device to receive the second data packets in response to the first audio-output device being associated with the first identifier included in the unicast transmission and causes the second audio-output device to utilize the second data packets for the audio output in response to the second audio-output device being configured to utilize the data packets sent as the unicast transmission to the first audio-output device without the second audio-output device being associated with the first identifier. For example, the selected receiving device may expect to receive the backup packets based at least in part on the selected receiving device having sent the retransmission requests that indicated backup packets were needed due to packet loss. Additionally, while a receiving device that is receiving a multicast transmission would not typically receive backup packets, the inclusion of the predetermined data such as a predetermined IP address, preamble information, QoS information, etc. may cause the other receiving devices to process the backup packets.

Additionally, or alternatively, the process 900 may include receiving first data indicating a first received signal strength indicator (RSSI) value associated with data received the first audio-output device and receiving second data indicating a second RSSI value associated with the data received at the second audio-output device. The process 900 may also include determining that the first RSSI value indicates packets are likely to be lost more than the second RSSI value. In these examples, designating the first audio-output device to receive the audio data utilizing the unicast transmission protocol may be in response to the first RSSI value being less than the second RSSI value.

Additionally, or alternatively, the process 900 may include selecting, over a first period of time, the first audio-output device to receive first data utilizing the unicast transmission protocol. The process 900 may also include determining a first number of lost packets over the first period of time from first retransmission requests sent from the first audio-output device. The process 900 may also include selecting, over a second period of time, the second audio-output device to receive second data utilizing the unicast transmission protocol. The process 900 may also include determining a second number of lost packets over the second period of time from second retransmission requests sent from the second audio-output device. The process 900 may also include determining that the first number of lost packets is more than the second number of lost packets. In these examples, designating the first audio-output device to receive the audio data utilizing the unicast transmission protocol may be in response to the first number of lost packets being more than the second number of lost packets.

Additionally, or alternatively, the process 900 may include determining that the audio data is to be sent to a third audio-output device and a fourth audio-output device. The process 900 may also include determining that a second wireless chipset and/or another component of the third audio-output device is unable to receive the audio data as sent to the first audio-output device using the unicast transmission protocol. The process 900 may also include determining that a third wireless chipset and/or another component of the fourth audio-output device is unable to receive the audio data as sent to the first audio-output device using the unicast transmission protocol. The process 900 may also include, in response to the third audio-output device and the fourth audio-output device being unable to receive the audio data as sent to the first audio-output device using the unicast transmission protocol, sending the multicast transmission of the audio data to the third audio-output device and the fourth audio-output device while the unicast transmission is sent to the first audio-output device.

Additionally, or alternatively, the process 900 may include determining that the first device is associated with a first device type indicating the first device is configured to output audio in a first audio frequency range. The process 900 may also include determining that the second device is associated with a second device type indicating the second device is configured to output the audio in a second audio frequency range that is lower than the first audio frequency range. In these examples, designating the first device to receive the first content data utilizing the unicast transmission protocol may be based at least in part on the first device being associated with the first device type and the second device being associated with the second device type.

Additionally, or alternatively, the process 900 may include determining that second content data is to be sent to a third device and a fourth device. The process 900 may also include determining that the third device is unable to process the second content data as sent to at least one other device using the unicast transmission protocol and determining that the fourth device is unable to process the second content data as sent to the at least one other device using the unicast transmission protocol. The process 900 may also include, based at least in part on the third device and the fourth device being unable to process the second content data as sent to the at least one other device using the unicast transmission protocol: sending the second content data utilizing a multicast transmission protocol; and sending a command to the first device, the command causing the first device to process the second content data utilizing the multicast transmission protocol as data sent utilizing the unicast transmission protocol such that the first device is caused to send retransmission requests without outputting content corresponding to the second content data.

Additionally, or alternatively, the process 900 may include determining that a first wireless chipset and/or another component of the first device has been configured to cause processing of first data sent using the unicast transmission protocol as the multicast transmission based on inclusion of a predefined internet protocol address in the first data. The process 900 may also include determining that a second wireless chipset and/or another component of the second device has been configured to cause processing of the first data sent using the unicast transmission protocol as the multicast transmission based on inclusion of the predefined internet protocol address in the first data. In these examples, the first content data may be sent utilizing the unicast transmission protocol based at least in part on the first wireless chipset and/or other component and the second wireless chipset and/or other component being configured to cause processing of the first data sent using the unicast transmission protocol as the multicast transmission.

Additionally, or alternatively, the process 900 may include determining that the first device has been configured to cause processing of first data sent using the unicast transmission protocol as the multicast transmission based on inclusion of predefined data in a preamble of a data packet sent to the first device. The process 900 may also include determining that the second device has been configured to cause processing of the first data sent using the unicast transmission protocol as the multicast transmission based on inclusion of the predefined data in the preamble of the data packet sent to the second device. In these examples, the first content data may be sent utilizing the unicast transmission protocol based at least in part on the first device and the second device being configured to cause processing of the first data sent using the unicast transmission protocol as the multicast transmission.

FIG. 10 illustrates a flow diagram of another example process 1000 for sending content data utilizing a data transmission protocol. The order in which the operations or steps are described is not intended to be construed as a limitation, and any number of the described operations may be combined in any order and/or in parallel to implement process 1000.

At block 1002, the process 1000 may include enabling a first device to send one or more retransmission requests indicating lost data packets of first data packets sent using a multicast transmission, wherein the multicast transmission indicates more than one device is designated to utilize the first data packets for content output. For example, a device selector may be configured to select a receiving device that is most likely to have associated lost packets and/or that is most likely to have the greatest amount of lost packets. To do so, the device selector may be configured to utilize one or more data types to determine which receiving device to select. The data types may include any or all of the configuration data described above, including device types, RSSI values, feedback data, device compliance data, and/or other inputs including inputs indicated as relevant for packet loss by one or more machine learning models. For example, the device type data may indicate frequency ranges that a given receiving device is configured to output audio in. In these examples, a subwoofer device may be configured to output audio at a first frequency range, while a tweeter device or other device may be configured to output audio at a second frequency range that is higher than the subwoofer device. Generally, packet loss at the subwoofer device may result in impaired sound quality that is less noticeable to the human ear than packet loss at devices that output audio at higher frequency ranges. As such, the receiving device that outputs audio at higher frequency ranges may be selected instead of a subwoofer device. Additionally, the RSSI values may be utilized to determine distances between the data distribution device and the receiving devices in an environment, and/or to which devices receive the most signal impedance based on their location in an environment with respect to other devices and objects of the environment. In these examples, the receiving device with the lowest RSSI values is likely to experience the most packet loss from the data distribution device, and as such may be selected to send retransmission requests. Additionally, the device compliance data may indicate which of the receiving devices is not configured to receive the transmissions described herein, or otherwise does not include wireless chipsets and/or other components that are configured to process received content data as described herein. By way of example, if one of the receiving devices is not configured to receive the transmissions but the other receiving devices are so configured, the receiving device not configured to receive the transmissions may be selected and a unicast transmission may be sent to that device.

In addition to the above, or alternatively, a feedback process may be initiated to determine which receiving device to select as described herein. Take for example an environment that includes three receiving devices. Each of the three receiving devices may be selected for a given period of time, and retransmission requests indicating packet loss may be received from each of the receiving devices during the respective periods of time when they are selected to provide retransmission requests. The amount and characteristics of these retransmission requests may be analyzed to determine which receiving device experiences the most packet loss and/or packet loss that most impacts sound quality. That device may be selected as the receiving device to send retransmission requests for subsequent content data sent by the data distribution device. This process may be repeated when changes to the environment occur, such as when a new device is added to the environment, a device is removed from the environment, an internet configuration of the environment changes, device locations change, etc. In addition to the above, one or more machine learning models may be trained to determine factors that impact packet loss and/or to determine how to weight the factors described above. These factors and/or weightings indicated by the trained machine learning models may be utilized to select a given receiving device that is to send retransmission requests.

At block 1004, the process 1000 may include sending, utilizing the multicast transmission, the first data packets representing first content data to the first device and to a second device. In this example, the multicast transmission may include one or more IP addresses and/or other data in sent data packets that may cause the receiving devices to process the data packets as a multicast transmission. Additionally, the multicast transmission may include a predetermined IP address or other data that may be received at the selected receiving device that may cause the selected receiving device to process the multicast transmission as a unicast transmission.

At block 1006, the process 1000 may include receiving, from the first device and based at least in part on enabling the first device to send data configured to be utilized for determining packet loss in response to the multicast transmission, data indicating packet loss. For example, when the selected receiving device determines that one or more packets have been lost, the selected receiving device may send one or more retransmission requests indicating that packets have been lost and indicating which packets have been lost.

At block 1008, the process 1000 may include sending second data packets representing the lost data packets at the first device, wherein sending the second data packets causes the first device and the second device to receive the second data packets as the multicast transmission. For example, the selected receiving device may expect to receive the backup packets based at least in part on the selected receiving device having sent the retransmission requests that indicated backup packets were needed due to packet loss. Additionally, while a receiving device that is receiving a multicast transmission would not typically receive backup packets, the inclusion of the predetermined data such as a predetermined IP address, preamble information, QoS information, etc. may cause the other receiving devices to process the backup packets.

Additionally, or alternatively, the process 1000 may include receiving first data indicating a first RSSI value associated with data received at the first device. The process 1000 may also include receiving second data indicating a second RSSI value associated with the data received at the second device. The process 1000 may also include determining that the first RSSI value indicates packets are lost more than the second RSSI value. In these examples, the enabling the first device may be based at least in part on the first RSSI value indicating packets are lost more than the second RSSI value.

Additionally, or alternatively, the process 1000 may include selecting, over a first period of time, the first device to enable to send the one or more retransmission requests in response to the multicast transmission protocol. The process 1000 may also include determining a first number of lost packets over the first period of time. The process 1000 may also include selecting, over a second period of time, the second device to enable to send the one or more retransmission requests in response to the multicast transmission protocol. The process 1000 may also include determining a second number of lost packets over the second period of time and determining that the first number of lost packets is more than the second number of lost packets. In these examples, enabling the first device may be based at least in part on the first number of lost packets being more than the second number of lost packets.

Additionally, or alternatively, the process 1000 may include determining that the first content data is to be sent to a third device. The process 1000 may also include determining that the third device is unable to send the one or more retransmission requests in response to the multicast transmission protocol. The process 1000 may also include, based at least in part on the third device being unable to send the one or more retransmission requests in response to the multicast transmission protocol, sending the first content data to the third device utilizing a unicast transmission protocol.

Additionally, or alternatively, the process 1000 may include determining that the first device is associated with a first device type indicating the first device is configured to output audio in a first audio frequency range. The process 1000 may also include determining that the second device is associated with a second device type indicating the second device is configured to output the audio in a second audio frequency range that is lower than the first audio frequency range. In these examples, enabling the first device may be based at least in part on the first device being associated with the first device type and the second device being associated with the second device type.

Additionally, or alternatively, the process 1000 may include determining that second content data is to be sent to a third device and determining that the third device is unable to send the one or more retransmission requests in response to the multicast transmission protocol. The process 1000 may also include, based at least in part on the third device being unable to send the one or more retransmission requests in response to the multicast transmission protocol, sending a command to the first device, the command causing the first device to process the second content data as a unicast transmission protocol such that the first device is caused to send retransmission requests without outputting content corresponding to the second content data.

Additionally, or alternatively, the process 1000 may include determining that a first wireless chipset and/or another component of the first device has been configured to cause processing of first data sent using the multicast transmission protocol as a unicast transmission based on inclusion of a predefined internet protocol address in the first data. The process 1000 may also include determining that a second wireless chipset and/or another component of the second device has been configured to cause processing of the first data sent using the multicast transmission protocol as the unicast transmission based on inclusion of the predefined internet protocol address in the first data. In these examples, the first content data may be sent utilizing the multicast transmission protocol based at least in part on the first wireless chipset and/or other component and the second wireless chipset and/or other component being configured to cause processing of the first data sent using the multicast transmission protocol as the unicast transmission.

Additionally, or alternatively, the process 1000 may include determining that the first device has been configured to cause processing of first data sent using the multicast transmission protocol as the unicast transmission based on inclusion of predefined data in a preamble of a data packet sent to the first device. The process 1000 may also include determining that the second device has been configured to cause processing of the first data sent using the multicast transmission protocol as the unicast transmission based on inclusion of the predefined data in the preamble of the data packet sent to the second device. In these examples, the first content data may be sent utilizing the multicast transmission protocol based at least in part on the first device and the second device being configured to cause processing of the first data sent using the multicast transmission protocol as the unicast transmission.

Figure 11:
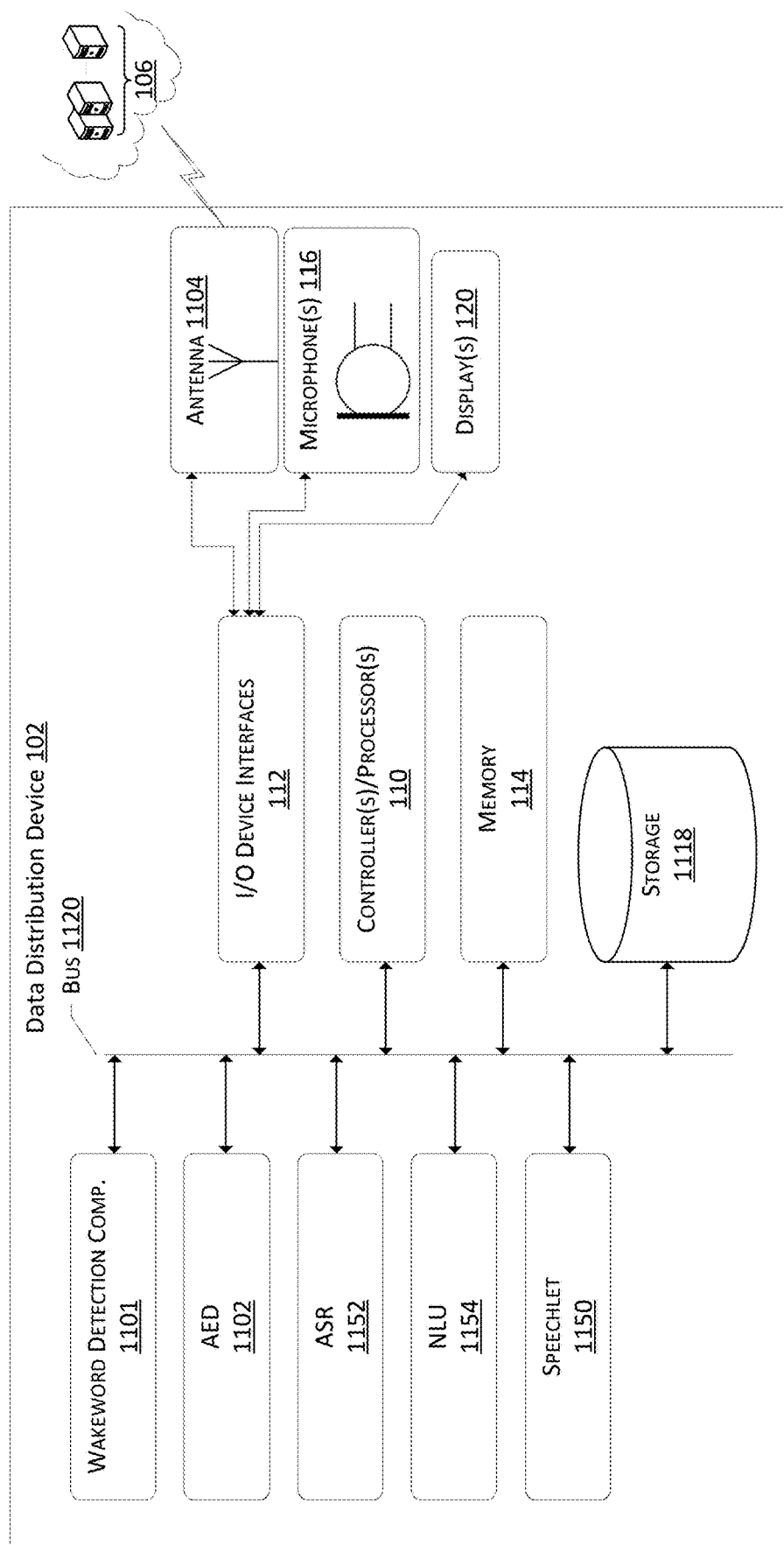
FIG. 11 illustrates a conceptual diagram of example components of an electronic device that may be utilized in association with data transmission protocols.

FIG. 11 illustrates a conceptual diagram of example components of an electronic device that may be utilized in association with data transmission protocols. The device 102 may be implemented as a standalone device 102 that is relatively simple in terms of functional capabilities with limited input/output components, memory, and processing capabilities. For instance, the device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102. Nonetheless, the primary, and potentially only mode, of user interaction with the device 102 is through voice input and audible output. In some instances, the device 102 may simply comprise a microphone 116, a power source, and functionality for sending generated audio data via one or more antennas 1104 to another device.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include a keyboard, a mouse, a display, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 116, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 11 may include one or more controllers/processors 110, that may include a central processing unit (CPU) for processing data and computer-readable instructions, and memory 114 for storing data and instructions of the device 102. The device 102 may also be connected to removable or external non-volatile memory and/or storage, such as a removable memory card, memory key drive, networked storage, etc., through input/output device interfaces 112.

Computer instructions for operating the device 102 and its various components may be executed by the device's controller(s)/processor(s) 110, using the memory 114 as temporary "working" storage at runtime. A device's computer instructions may be stored in a non-transitory manner in non-volatile memory 114, storage 1118, or an external device(s). Alternatively, some or all of the executable instructions may be embedded in hardware or firmware on the device 102 in addition to or instead of software.

The device 102 may include input/output device interfaces 112. A variety of components may be connected through the input/output device interfaces 112. Additionally, the device 102 may include an address/data bus 1120 for conveying data among components of the respective device. Each component within a device 102 may also be directly connected to other components in addition to, or instead of, being connected to other components across the bus 1120.

The device 102 may include a display 120, which may comprise a touch interface. Any suitable display technology, such as liquid crystal display (LCD), organic light emitting diode (OLED), electrophoretic, and so on, may be utilized for the displays 120. Furthermore, the processor(s) 110 may comprise graphics processors for driving animation and video output on the associated display, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102. The input/output device interfaces 112 that connect to a variety of components. This wired or a wireless audio and/or video port may allow for input/output of audio/video to/from the device 102. The device 102 may also include an audio capture component. The audio capture component may be, for example, a microphone 116 or array of microphones, a wired headset or a wireless headset, etc. The microphone 116 may be configured to capture audio. If an array of microphones is included, approximate distance to a sound's point of origin may be determined using acoustic localization based on time and amplitude differences between sounds captured by different microphones of the array. The device 102 (using microphone 116, wakeword detection component 1101, ASR component 1152, etc.) may be configured to generate audio data corresponding to captured audio. The device 102 (using input/output device interfaces 112, antenna 1104, etc.) may also be configured to transmit the audio data to the system 106 for further processing or to process the data using internal components such as a wakeword detection component 1101.

Via the antenna(s) 1104, the input/output device interface 112 may connect to one or more networks 108 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 108, the speech-processing system may be distributed across a networked environment.

Accordingly, the device 102 and/or the system 106 may include an ASR component 1152. The ASR component 1152 of device 102 may be of limited or extended capabilities. The ASR component 1152 may include language models stored in ASR model storage component, and an ASR component 1152 that performs automatic speech recognition. If limited speech recognition is included, the ASR component 1152 may be configured to identify a limited number of words, such as keywords detected by the device, whereas extended speech recognition may be configured to recognize a much larger range of words.

The device 102 and/or the system 106 may include a limited or extended NLU component 1154. The NLU component 1154 of device 102 may be of limited or extended capabilities. The NLU component 1154 may comprise a name entity recognition module, an intent classification module and/or other components. The NLU component 1154 may also include a stored knowledge base and/or entity library, or those storages may be separately located.

In examples, AED 1102 may also be performed by the device 102. In these examples, the operations may include causing the AED component 1102 to be enabled or otherwise turned on, or the operations may include causing the AED component 1102 to transition from a first mode to a second mode representing a higher sensitivity to audio data generated by the microphone 116. The AED component 1102 may utilize the audio data generated by the microphone 116 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 1102 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 1102 may determine that the audio fingerprint corresponds to at least one of the reference audio fingerprints, such as to a given confidence level, and may generate confirmatory data indicating that the audio fingerprint corresponds to the at least one reference audio fingerprint.

The device 102 and/or the system 106 may also include speechlet 1150 that is configured to execute commands/functions associated with a spoken command as described herein. The device 102 may include a wake word engine, which may be a separate component or may be included in an ASR component 1152. The wakeword detection component 1101 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred. In examples, the device 102 and may not include speaker(s) 118 and may utilize speaker(s) of an external or peripheral device to output audio via the speaker(s) of the external/peripheral device.

Figure 12:
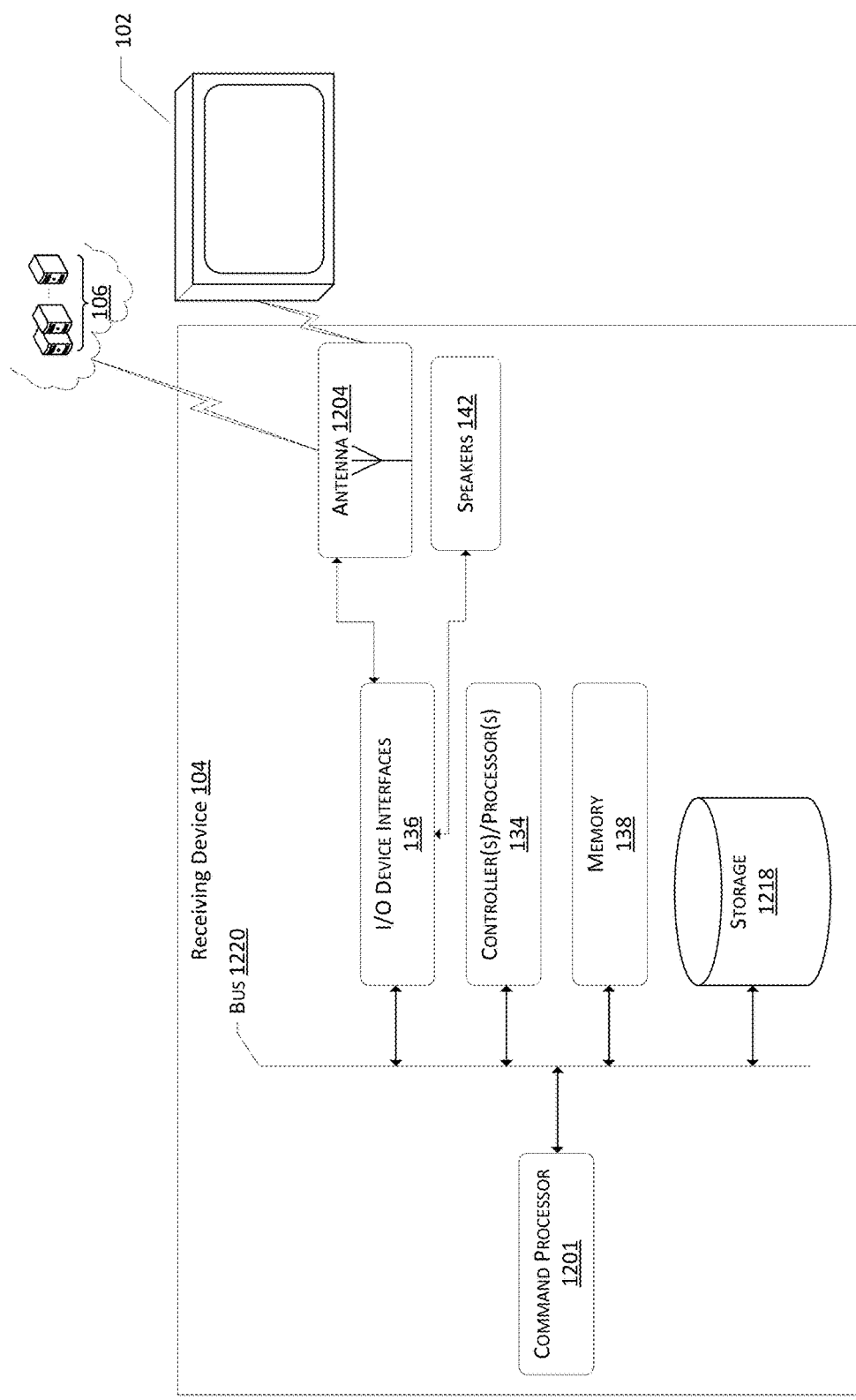
FIG. 12 illustrates a conceptual diagram of example components of a receiving device that may be utilized in association with data transmission protocols.

FIG. 12 illustrates a conceptual diagram of example components of receiving device 104(a)-(d) that may be utilized in association with data transmission protocols. For example, the device 104(a)-(d) may include a device that includes output means to output content, such as audio and/or images. The device 104(a)-(d) may be implemented as a standalone device that is relatively simple in terms of functional capabilities with limited input/output components, memory, and processing capabilities. For instance, the device 104(a)-(d) may not have a keyboard, keypad, touchscreen, or other form of mechanical input. In some instances, the device 104(a)-(d) may include a microphone, a power source, and functionality for sending generated audio data via one or more antennas 1204 to another device and/or system.

The device 104(a)-(d) of FIG. 12 may include one or more controllers/processors 134, that may include a central processing unit (CPU) for processing data and computer-readable instructions, and memory 138 for storing data and instructions of the device 104. In examples, the skills and/or applications described herein may be stored in association with the memory 138, which may be queried for content and/or responses as described herein. The device 104(a)-(d) may also be connected to removable or external non-volatile memory and/or storage, such as a removable memory card, memory key drive, networked storage, etc., through input/output device interfaces 136.

Computer instructions for operating the device 104(a)-(d) and its various components may be executed by the device's controller(s)/processor(s) 134, using the memory 138 as "working" storage at runtime. A device's computer instructions may be stored in a non-transitory manner in non-volatile memory 138, storage 1218, or an external device(s). Alternatively, some or all of the executable instructions may be embedded in hardware or firmware on the device 104(a)-(d) in addition to or instead of software.

The device 104(a)-(d) may include input/output device interfaces 136. A variety of components may be connected through the input/output device interfaces 136. Additionally, the device 104(a)-(d) may include an address/data bus 1220 for conveying data among components of the respective device. Each component within a device 104(a)-(d) may also be directly connected to other components in addition to, or instead of, being connected to other components across the bus 1220.

The processor(s) 134 may comprise graphics processors for driving animation and video output on the associated lights and/or displays. As a way of indicating to a user that a connection between another device has been opened, the device 104(a)-(d) may be configured with one or more visual indicators, such as light(s), which may be in the form of LED(s) or similar components (not illustrated), that may change color, flash, or otherwise provide visible light output, such as for a notification indicator on the device 104(a)-(d). The device 104(a)-(d) may also include an audio capture component. The audio capture component may be, for example, a microphone or array of microphones, a wired headset or a wireless headset, etc. The microphone may be configured to capture audio. If an array of microphones is included, approximate distance to a sound's point of origin may be determined using acoustic localization based on time and amplitude differences between sounds captured by different microphones of the array. The device 104(a)-(d) (using input/output device interfaces 136, antenna 1204, etc.) may also be configured to transmit audio data to the system 106 for processing.

Via the antenna(s) 1204, the input/output device interface 136 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 104 via wired connection to an external alternating current (AC) outlet, and/or via onboard power sources, such as batteries, solar panels, etc.

The device 104(a)-(d) and/or the system 106 may also include a command processor 1201 that is configured to execute commands/functions as described herein. For example, one or more commands may be received by the device 104(a)-(d) from the system 106 and/or from another device such as a user device and/or the audio-input device. The command processor 1201 may receive the commands and utilize the components of the device 104(a)-(d) to process those commands. Such commands may cause the device 104(a)-(d) to output sound, such as via speakers.

Figure 13A:
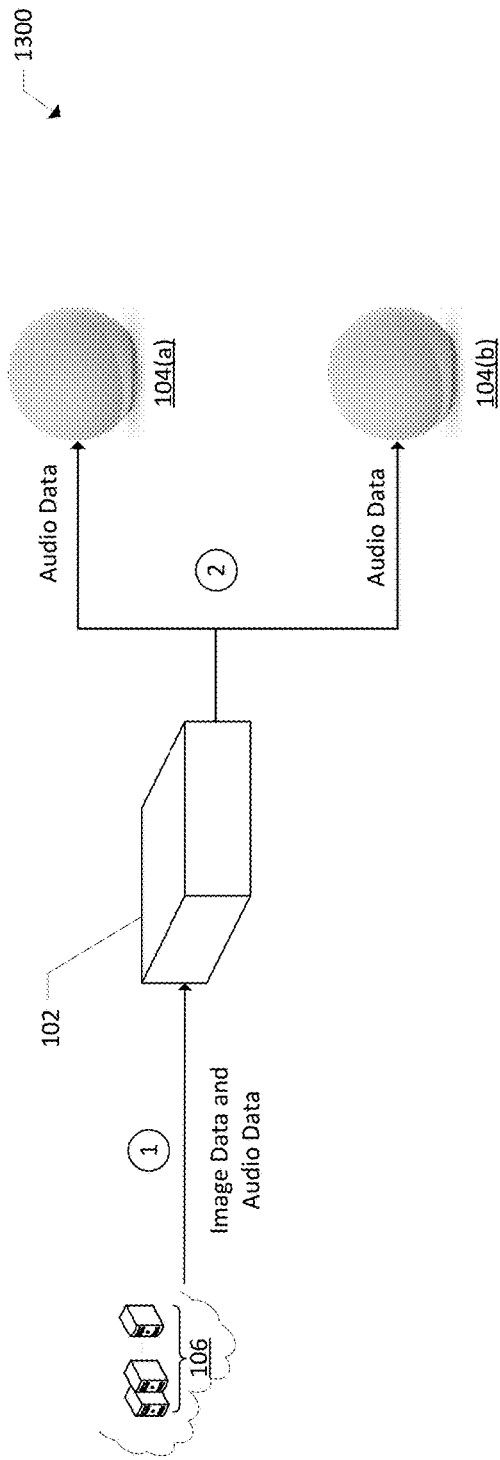
FIG. 13A illustrates a conceptual diagram of example devices utilized for outputting audio in a time-synchronous manner with each other and/or with display of images.

FIG. 13A illustrates a conceptual diagram of example devices utilized for outputting audio in a time-synchronous manner with each other and/or with display of images. The system 1300 may include at least some of the components of the system 100 from FIG. 1. For example, the system 1300 may include a data distribution device 102 and/or one or more receiving devices 104(a)-(b) and/or a system 106. FIG. 13A depicts the exchange of information and/or the performance of processes via the various components utilizing steps 1 and 2. However, it should be understood that the processes may be performed in any order and need not be performed in sequential order as depicted in FIG. 13A.

At step 1, content data, such as image data and audio data, may be sent from the system 106 to the data distribution device 102. By way of example, a user may request that content may be displayed and/or otherwise output utilizing devices located in an environment. The request may be from user input to, for example, a personal device such as a mobile phone, tablet, and/or computer, and/or the request may be from a user utterance spoken by the user and captured by a microphone of one or more of the devices within the environment. For example, a user may provide input indicating an intent to play a video associated with a movie on a television within the environment while one or more other devices output audio of the movie. Input data corresponding to the input may be sent to, for example, the system 106 configured to retrieve content associated with the request. In examples where the input comprises a user utterance, audio data corresponding to the user utterance may be sent to the system 106. A speech-processing system may generate intent data indicating an intent associated with the user utterance. In the example where the user utterance indicates an intent to output content on the one or more devices, a speechlet may receive the intent data and/or a payload associated with the intent data and may utilize that information to determine what content is to be provided to the device 102 for output. A content component may retrieve the requested content and the system 106 may send the content to the device 102. The content, in a given example may include image data and audio data. In other examples, the content may include just image data, just audio data, and/or other types of data.

At step 2, the device 102 may send data packets, such as audio-data packets to the receiving devices 104(a)-(b). For example, the device 102 may receive the content data and may send all or a portion of the content data to the receiving devices 104(a)-(b). In these examples, the data may be sent to the receiving devices 104(a)-(b) as data packets utilizing one or more protocols.

The device 102 and/or the receiving devices 104(a)-(b) may utilize associations between time kept by the device 102 and time kept by the receiving devices 104(a)-(b) to determine how and when to send packets to the receiving devices 104(a)-(b) such that the video is output by the device 102 and/or another device having a video interface in a time-synchronous manner with output of the audio on the receiving devices 104(a)-(b).

Figure 13B:
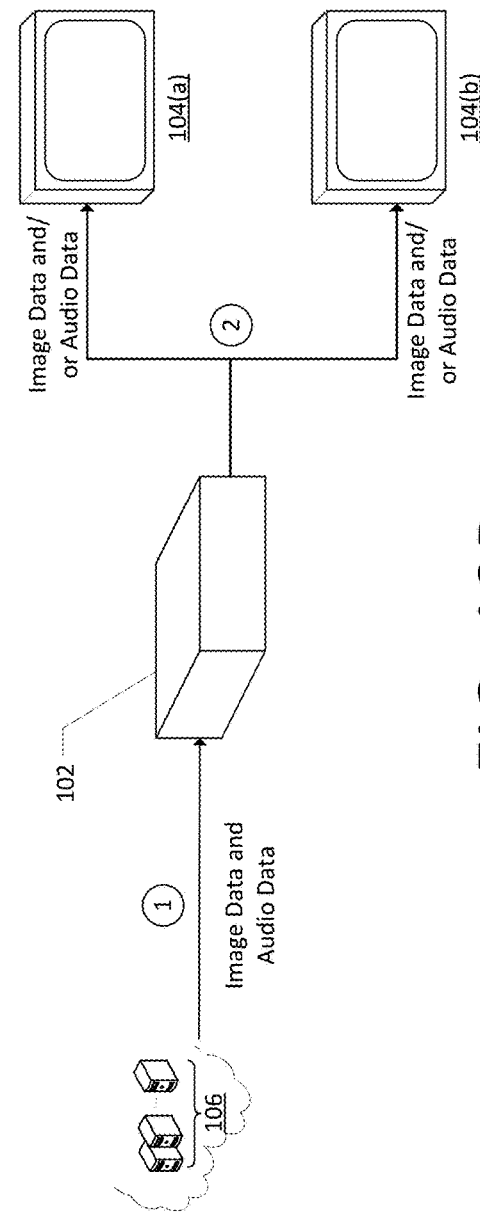
FIG. 13B illustrates a conceptual diagram of example devices utilized for outputting images and/or audio in a time-synchronous manner with each other.

FIG. 13B illustrates a conceptual diagram of example devices utilized for outputting images and/or audio in a time-synchronous manner with each other. The system 1300 may include at least some of the components of the system 100 from FIG. 1. For example, the system 1300 may include a data distribution device 102 and/or one or more receiving devices 104(a)-(b) and/or a system 106. FIG. 13B depicts the exchange of information and/or the performance of processes via the various components utilizing steps 1 and 2. However, it should be understood that the processes may be performed in any order and need not be performed in sequential order as depicted in FIG. 13B.

At step 1, content data, such as image data and audio data, may be sent from the system 106 to the data distribution device 102. By way of example, a user may request that content may be displayed and/or otherwise output utilizing devices located in an environment. The request may be from user input to, for example, a personal device such as a mobile phone, tablet, and/or computer, and/or the request may be from a user utterance spoken by the user and captured by a microphone of one or more of the devices within the environment. For example, a user may provide input indicating an intent to play a video associated with a movie on a television within the environment while one or more other devices output audio of the movie. Input data corresponding to the input may be sent to, for example, the system 106 configured to retrieve content associated with the request. In examples where the input comprises a user utterance, audio data corresponding to the user utterance may be sent to the system 106. A speech-processing system may generate intent data indicating an intent associated with the user utterance. In the example where the user utterance indicates an intent to output content on the one or more devices, a speechlet may receive the intent data and/or a payload associated with the intent data and may utilize that information to determine what content is to be provided to the device 102 for output. A content component may retrieve the requested content and the system 106 may send the content to the device 102. The content, in a given example may include image data and audio data. In other examples, the content may include just image data, just audio data, and/or other types of data.

At step 2, the device 102 may send data packets, such as audio-data packets and/or image-data packets to the receiving devices 104(a)-(b). For example, the device 102 may receive the content data and may send all or a portion of the content data to the receiving devices 104(a)-(b). In these examples, the data may be sent to the receiving devices 104(a)-(b) as data packets utilizing one or more protocols.

The device 102 and/or the receiving devices 104(a)-(b) may utilize associations between time kept by the device 102 and time kept by the receiving devices 104(a)-(b) to determine how and when to send packets to the receiving devices 104(a)-(b) such that the video is output by the device 102 and/or another device having a video interface in a time-synchronous manner with output of the audio and/or video on the receiving devices 104(a)-(b).

Figure 14:
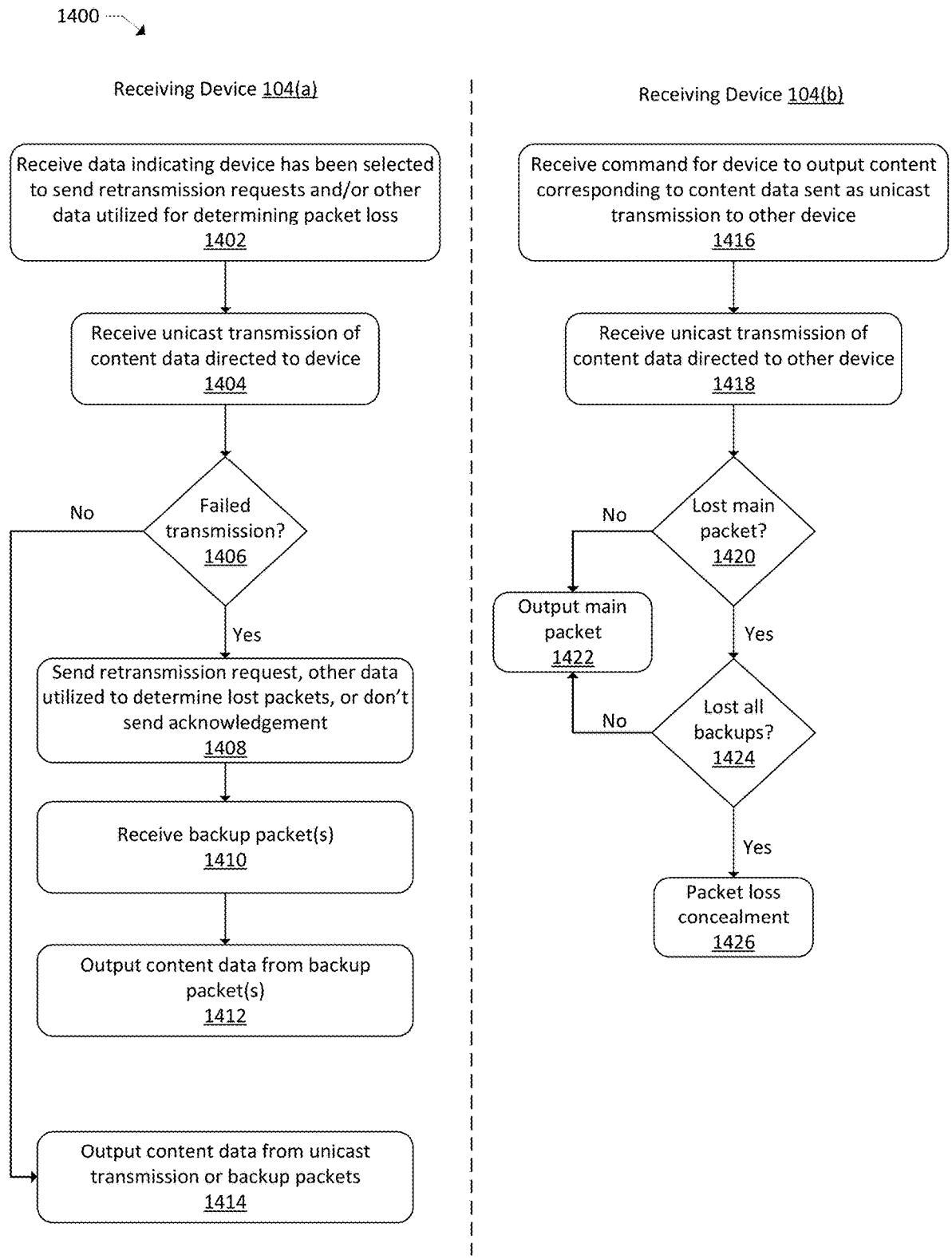
FIG. 14 illustrates a flow diagram of an example process for receiving devices utilizing a first data transmission protocol as described herein.
Figure 15:
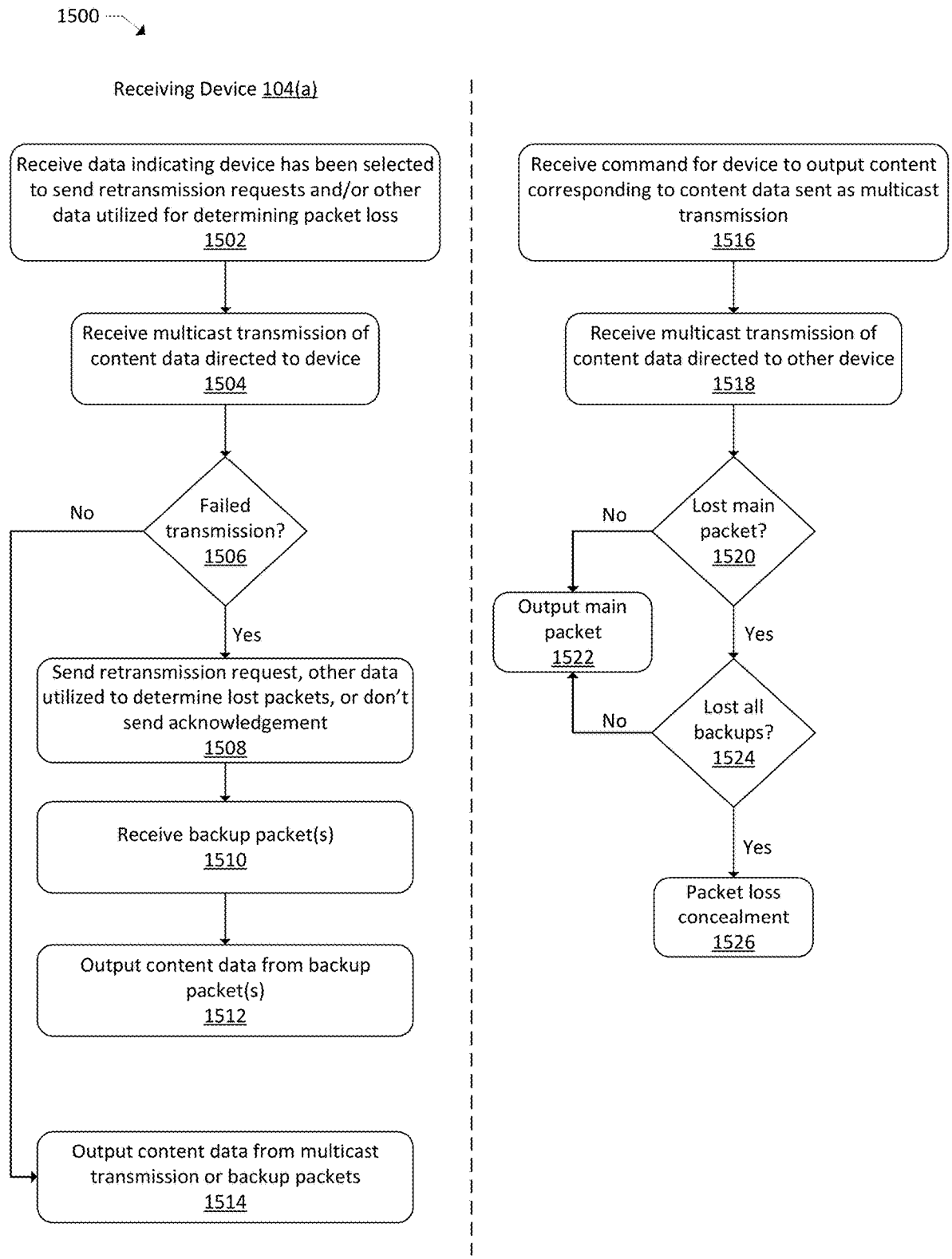
FIG. 15 illustrates a flow diagram of an example process for receiving devices utilizing a second data transmission protocol as described herein.

FIGS. 14 and 15 illustrate processes for data transmission protocols. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-13, although the processes may be implemented in a wide variety of other environments, architectures and systems.

FIG. 14 illustrates a flow diagram of an example process 1400 for receiving devices utilizing a first data transmission protocol as described herein. The order in which the operations or steps are described is not intended to be construed as a limitation, and any number of the described operations may be combined in any order and/or in parallel to implement process 1400.

At block 1402, the process 1400 may include a first receiving device 104(a) receiving data indicating the first receiving device has been selected to send retransmission requests and/or other data utilized for determining packet loss to a data distribution device. For example, the device selection operations described above with respect to FIG. 4 may be performed to determine that the first receiving device is to be the selected receiving device.

At block 1404, the process 1400 may include receiving a unicast transmission of content data directed to the first receiving device. For example, a data distribution device may transmission a unicast transmission of the content data directed to the first receiving device utilizing an IP address associated with the first receiving device. The first receiving device may receive the transmission and may process the content data based at least in part on the transmission being directed to the IP address of the first receiving device.

At block 1406, the process 1400 may include determining whether failure of the unicast transmission, at least in part, has occurred. For example, as explained in more detail with respect to FIG. 1, if one or more packets are not received at the first receiving device or are received too late to be output in order with other received packets, such packets may be considered lost and this may constituent at least a partial failure of the unicast transmission to the receiving device.

In examples where the transmission fails at least in part, the process 1400 may include, at block 1408, sending one or more retransmission requests, and/or the other data utilized for determining lost packets to the data distribution device, and/or the receiving device not sending acknowledgements of received packets to the data distribution device. For example, the first receiving device may generate one or more retransmission requests indicating that a packet has been lost and indicating which packet has been lost. These retransmission requests may be sent to the data distribution device for use by the data distribution device in determining which packets should be retransmitted as backup packets. Alternatively, the first receiving device may send acknowledgements of received packets to the data distribution device. When a packet is lost, the first receiving device does not send an acknowledgement that the lost packet was received. The data distribution device may utilize this data to determine that one or more packets are lost and may generate corresponding backup packets.

At block 1410, the process 1400 may include receiving backup packets from the data distribution device. The backup packets may be received as a unicast transmission and/or as a multicast transmission. In some examples, backup packets may not be received, and in these examples the receiving device may perform packet loss concealment operations to mitigate the negative effects of the packet loss.

At block 1412, the process 1400 may include outputting the content data from the backup packets. For example, the first receiving device may be caused to output content such as audio, video, lighting data, etc. that corresponds to the content data from the payloads of the content data packets sent to the first receiving device as well as the content data from the payloads of the backup packets.

Returning to block 1406, in examples where one or more packets have not been lost, the process 1400 may include, at block 1414, outputting the content data from the unicast transmission or from the backup packets. In this example, since no backup packets are received, the output content corresponds only to the content data from the payloads of the packets originally sent by the data distribution device.

While the operations 1402 through 1414 are being performed, additional operations may be performed by a second receiving device 104(b).

For example, at block 1416, the second receiving device may receive a command for the second receiving device to output content corresponding to the content data sent as the unicast transmission to the first receiving device. For example, while the second receiving device has not been chosen the send retransmission requests and/or other data utilized to determine lost packets, the second receiving device is still to be configured to receive the unicast transmission directed to the first receiving device and to treat that unicast transmission as a multicast transmission such that the second receiving device outputs the content.

At block 1418, the process 1400 may include receiving the unicast transmission of the content data directed to the first receiving device. Generally, a wireless chipset and/or other component of the second receiving device may disregard or otherwise not process content data sent as a unicast transmission to another device, but as described herein the second receiving device may receive the unicast transmission and treat the unicast transmission as the multicast transmission for purposes of processing the content data.

At block 1420, the process 1400 may include determining whether an original or otherwise a main packet of the sent packets have been lost.

In examples where one or more main packets have not been lost, the process 1400 may include, at block 1422, outputting content corresponding to the main packet. For example, the second receiving device may be caused to output content such as audio, video, lighting data, etc. that corresponds to the content data from the payloads of the content data packets sent to the first receiving device.

In examples where one or more main packets have been lost, the process 1400 may include, at block 1424, determining whether all the backup packets that correspond to the lost main packets have also been lost. In examples where all the backup packets are not lost, the process 1400 may continue to block 1422, where the backup packets may be output in place of the main packet. In examples where all the backup packets are lost, the receiving device may perform packet loss concealment operations at block 1426, as described herein.

FIG. 15 illustrates a flow diagram of an example process 1500 for receiving devices utilizing a second data transmission protocol as described herein. The order in which the operations or steps are described is not intended to be construed as a limitation, and any number of the described operations may be combined in any order and/or in parallel to implement process 1500.

At block 1502, the process 1500 may include receiving data indicating a first receiving device 104(*a*) has been selected to process a multicast transmissions as unicast transmissions, and in so doing may send retransmission requests and/or other data utilized for determining packet loss to the data distribution device. For example, the device selection operations described above with respect to FIG. 4 may be performed to determine that the first receiving device is to be the selected receiving device.

At block 1504, the process 1500 may include receiving a multicast transmission of content data from a data distribution device. For example, the data distribution device may send content data as a multicast transmission, which may be received and processed by any authorized device within communication distance of the data distribution device.

At block 1506, the process 1500 may include determining whether failure of the unicast transmission, at least in part, has occurred. For example, as explained in more detail with respect to FIG. 1, if one or more packets are not received at the first receiving device or are received too late to be output in order with other received packets, such packets may be considered lost and this may constituent at least a partial failure of the multicast transmission to the receiving device.

In examples where the multicast transmission fails at least partially, the process 1500 may include, at block 1508, sending one or more retransmission requests and/or other utilized to determine lost packets to the data distribution data and/or the receiving device not sending an acknowledgment of the loss packets. For example, the first receiving device may generate one or more retransmission requests indicating that a packet has been lost and indicating which packet has been lost. These retransmission requests may be sent to the data distribution device for use by the data distribution device in determining which packets should be retransmitted as backup packets. Alternatively, the first receiving device may send acknowledgements of received packets to the data distribution device. When a packet is lost, the first receiving device does not send an acknowledgement that the lost packet was received. The data distribution device may utilize this data to determine that one or more packets are lost and may generate corresponding backup packets.

At block 1510, the process 1500 may include receiving one or more backup packets from the data distribution device. The backup packets may be received as a unicast transmission and/or as a multicast transmission. In some examples, backup packets may not be received, and in these examples the receiving device may perform packet loss concealment operations to mitigate the negative effects of the packet loss.

At block 1512, the process 1500 may include outputting the content data from the one or more backup packets on the first receiving device. For example, the first receiving device may be caused to output content such as audio, video, lighting data, etc. that corresponds to the content data from the payloads of the content data packets sent as the multicast transmission as well as the content data from the payloads of the backup packets.

Returning to block 1506, in examples where one or more packets are not lost, the process 1500 may include, at block 1514, outputting the content data from the multicast transmission or the backup packets.

While the operations 1502 through 1514 are being performed, additional operations may be performed by a second receiving device 104(*b*).

For example, at block 1516, the second receiving device may receive a command for the second receiving device to output content corresponding to the content data sent as the multicast transmission. For example, while the second receiving device has not been chosen the send retransmission requests and/or other data utilized to determine lost packets, the second receiving device is still to be configured to receive the multicast transmission such that the second receiving device outputs the content.

At block 1518, the process 1400 may include receiving the multicast transmission of the content data directed to the first receiving device. At block 1520, the process 1500 may include determining whether an original or otherwise a main packet of the sent packets have been lost.

In examples where one or more main packets have not been lost, the process 1500 may include, at block 1522, outputting content corresponding to the main packet. For example, the second receiving device may be caused to output content such as audio, video, lighting data, etc. that corresponds to the content data from the payloads of the content data packets sent to the first receiving device.

In examples where one or more main packets have been lost, the process 1500 may include, at block 1524, determining whether all the backup packets that correspond to the lost main packets have also been lost. In examples where all the backup packets are not lost, the process 1500 may continue to block 1522, where the backup packets may be output in place of the main packet. In examples where all the backup packets are lost, the receiving device may perform packet loss concealment operations at block 1526, as described herein.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A device, comprising:
   one or more processors; and
   non-transitory computer-readable media storing computer-executable instructions that, when executed by the one or more processors, cause the one or more processors to perform operations comprising:
     receiving audio data;
     determining that the audio data is to be sent to a first audio-output device;
     determining that the audio data is to be sent to a second audio-output device;
     determining that the first audio-output device is configured to output audio in a first audio frequency range;
     determining that the second audio-output device is configured to output the audio in a second audio frequency range that is lower than the first audio frequency range;
     designating, based at least in part on the first audio-output device being configured to output the audio in the first audio frequency range and the second audio-output device being configured to output the audio in the second audio frequency range, the first audio-output device to receive the audio data utilizing a unicast transmission, wherein the unicast transmission includes a first identifier of the first audio-output device that is designated to utilize the audio data for audio output, wherein a first wireless component of the second audio-output device has been configured to utilize data packets sent as the unicast transmission from the device and directed to the first audio-output device for the audio output without the second audio-output device being associated with the first identifier;
     sending, utilizing the unicast transmission, first data packets representing the audio data to the first audio-output device, wherein the second audio-output device utilizes the first data packets for the audio output;
     receiving, from the first audio-output device, first data indicating packets lost at the first audio-output device; and
     sending, to the first audio-output device and as the unicast transmission, second data packets representing the packets lost at the first audio-output device, wherein sending the second data packets causes the first audio-output device to receive the second data packets in response to the first audio-output device being associated with the first identifier included in the unicast transmission and causes the second audio-output device to utilize the second data packets for the audio output in response to the second audio-output device being configured to utilize the data packets sent as the unicast transmission to the first audio-output device without the second audio-output device being associated with the first identifier.

2. The device of claim 1, the operations further comprising:
   receiving second data indicating a first received signal strength indicator (RSSI) value associated with data received at the first audio-output device;
   receiving third data indicating a second RSSI value associated with data received at the second audio-output device;
   determining that the first RSSI value indicates packets are more likely to be lost than the second RSSI value; and
   wherein designating the first audio-output device to receive the audio data utilizing the unicast transmission is in response to the first RSSI value indicating packets are more likely to be lost than the second RSSI value.

3. The device of claim 1, the operations further comprising:
   selecting, over a first period of time, the first audio-output device to receive second data;
   determining a first number of lost packets over the first period of time from third data indicating packet loss sent from the first audio-output device;
   selecting, over a second period of time, the second audio-output device to receive fourth data;
   determining a second number of lost packets over the second period of time from fifth data indicating packet loss sent from the second audio-output device;
   determining that the first number of lost packets indicates more packet loss than the second number of lost packets; and
   wherein designating the first audio-output device to receive the audio data utilizing the unicast transmission is in response to the first number of lost packets indicating more packet loss than the second number of lost packets.

4. The device of claim 1, the operations further comprising:
   determining that the audio data is to be sent to a third audio-output device;
   determining that the audio data is to be sent to a fourth audio-output device;
   determining that a second wireless component of the third audio-output device is unable to receive the audio data as sent to the first audio-output device using the unicast transmission;
   determining that a third wireless component of the fourth audio-output device is unable to receive the audio data as sent to the first audio-output device using the unicast transmission; and
   in response to the third audio-output device and the fourth audio-output device being unable to receive the audio data as sent to the first audio-output device using the unicast transmission, sending a multicast transmission of the audio data to the third audio-output device and the fourth audio-output device while the unicast transmission is sent to the first audio-output device, wherein the multicast transmission indicates more than one device is designated to utilize the audio data for audio output.

5. A method, comprising:
   determining that a first device is associated with a first device type indicating the first device is configured to output audio in a first audio frequency range;
   determining that a second device is associated with a second device type indicating the second device is configured to output the audio in a second audio frequency range that is lower than the first audio frequency range;
   designating, based at least in part on the first device being configured to output the audio in the first audio frequency range and the second device being configured to output the audio in the second audio frequency range, the first device to receive first content data utilizing a unicast transmission, wherein the unicast transmission includes a first identifier of the first device that is designated to utilize the first content data for content output, wherein a first wireless component of the second device has been configured to utilize data packets sent as the unicast transmission and directed to the first device for the content output;

sending the unicast transmission of first data packets representing the first content data to the first device;

receiving, from the first device, first data indicating packets lost at the first device; and sending, to the first device and utilizing the unicast transmission, second data packets representing the packets lost at the first device, wherein sending the second data packets causes the first device to receive the second data packets as the unicast transmission and causes the second device to utilize the second data packets for the content output.

6. The method of claim 5, further comprising:

receiving second data indicating a first received signal strength indicator (RSSI) value associated with data received at the first device;

receiving third data indicating a second RSSI value associated with the data received at the second device;

determining that the first RSSI value indicates packets are more likely to be lost than the second RSSI value; and wherein designating the first device to receive the first content data utilizing the unicast transmission comprises designating the first device to receive the first content data utilizing the unicast transmission based at least in part on the first RSSI value indicating packets are more likely to be lost than the second RSSI value.

7. The method of claim 5, further comprising:

selecting, over a first period of time, the first device to receive second data;

determining a first number of lost packets over the first period of time;

selecting, over a second period of time, the second device to receive third data;

determining a second number of lost packets over the second period of time;

determining that the first number of lost packets indicates packets are more likely to be lost than the second number of lost packets; and wherein designating the first device to receive the first content data utilizing the unicast transmission comprises designating the first device to receive the first content data utilizing the unicast transmission based at least in part on the first number of lost packets indicating packets are more likely to be lost than the second number of lost packets.

8. The method of claim 5, further comprising:

determining that the first content data is to be sent to a third device;

determining that the first content data is to be sent to a fourth device;

determining that the third device is unable to receive the first content data as sent to the first device using the unicast transmission;

determining that the fourth device is unable to receive the first content data as sent to the first device using the unicast transmission; and based at least in part on the third device and the fourth device being unable to receive the first content data as sent to the first device using the unicast transmission, sending a multicast transmission of the first content data to the third device and the fourth device, wherein the multicast transmission indicates more than one device is designated to utilize the first content data for content output.

9. The method of claim 5, further comprising:

determining that second content data is to be sent to a third device;

determining that the second content data is to be sent to a fourth device;

determining that the third device is unable to process the second content data as sent to at least one other device using the unicast transmission;

determining that the fourth device is unable to process the second content data as sent to the at least one other device using the unicast transmission; and based at least in part on the third device and the fourth device being unable to process the second content data as sent to the at least one other device using the unicast transmission:

sending the second content data utilizing a multicast transmission, wherein the multicast transmission indicates more than one device is designated to utilize the second content data for content output; and sending a command to the first device, the command causing the first device to process the second content data utilizing the multicast transmission such that the first device is caused to send retransmission requests without outputting content corresponding to the second content data.

10. The method of claim 5, further comprising:

determining that a first wireless component of the first device has been configured to cause output of content sent using the unicast transmission as if the content was sent absent the first identifier based on inclusion of a predefined internet protocol address in the content;

determining that a second wireless component of the second device has been configured to cause output of the content sent using the unicast transmission as if the content was sent absent a second identifier of the second device based on inclusion of the predefined internet protocol address in the content; and wherein the first content data is sent utilizing the unicast transmission based at least in part on the first wireless component and the second wireless component being configured to cause output of the content sent using the unicast transmission as if the content was sent absent the first identifier and the second identifier.

11. The method of claim 5, further comprising:

determining that a first wireless component of the first device has been configured to cause output of content sent using the unicast transmission as if the content was sent absent the first identifier based on inclusion of predefined data in a preamble of a data packet sent to the first device;

determining that a second wireless component of the second device has been configured to cause output of the content sent using the unicast transmission as if the content was sent absent a second identifier of the second device based on inclusion of the predefined data in the preamble of the data packet sent to the second device; and wherein the first content data is sent utilizing the unicast transmission based at least in part on the first device and the second device being configured to cause output of the content sent using the unicast transmission as if the content was sent absent the first identifier and the second identifier.

12. The method of claim 5, further comprising:
querying a trained model for a selection of a target device to designate to receive the first content data;
receiving, from the trained model, results data indicating selection of the first device; and
wherein designating the first device to receive the first content data utilizing the unicast transmission comprises designating the first device to receive the first content data utilizing the unicast transmission based at least in part on the results data from the trained model.

13. A system, comprising:
one or more processors; and
non-transitory computer-readable media storing instructions that, when executed by the one or more processors, cause the system to perform operations comprising:
  determining that a first device is associated with a first device type indicating the first device is configured to output audio in a first audio frequency range;
  determining that a second device is associated with a second device type indicating the second device is configured to output the audio in a second audio frequency range that is lower than the first audio frequency range;
  designating, based at least in part on the first device being configured to output the audio in the first audio frequency range and the second device being configured to output the audio in the second audio frequency range, the first device to receive first content data utilizing a unicast transmission, wherein the unicast transmission includes a first identifier of the first device that is designated to utilize the first content data for content output, wherein a first wireless component of the second device has been configured to utilize data packets sent as the unicast transmission and directed to the first device for the content output;
  sending the unicast transmission of first data packets representing the first content data to the first device;
  receiving, from the first device, first data indicating packets lost at the first device; and
  sending, to the first device and utilizing the unicast transmission, second data packets representing the packets lost at the first device, wherein sending the second data packets causes the first device to receive the second data packets as the unicast transmission and causes the second device to utilize the second data packets for the content output.

14. The system of claim 13, the operations further comprising:
receiving second data indicating a first received signal strength indicator (RSSI) value associated with data received at the first device;
receiving third data indicating a second RSSI value associated with the data received at the second device;
determining that the first RSSI value indicates packets are more likely to be lost than the second RSSI value; and
wherein designating the first device to receive the first content data utilizing the unicast transmission comprises designating the first device to receive the first content data utilizing the unicast transmission based at least in part on the first RSSI value indicating packets are more likely to be lost than the second RSSI value.

15. The system of claim 13, the operations further comprising:
selecting, over a first period of time, the first device to receive second data;
determining a first number of lost packets over the first period of time;
selecting, over a second period of time, the second device to receive third data;
determining a second number of lost packets over the second period of time;
determining that the first number of lost packets indicates packets are more likely to be lost than the second number of lost packets; and
wherein designating the first device to receive the first content data utilizing the unicast transmission comprises designating the first device to receive the first content data utilizing the unicast transmission based at least in part on the first number of lost packets indicating packets are more likely to be lost than the second number of lost packets.

16. The system of claim 13, the operations further comprising:
determining that the first content data is to be sent to a third device;
determining that the first content data is to be sent to a fourth device;
determining that the third device is unable to receive the first content data as sent to the first device using the unicast transmission;
determining that the fourth device is unable to receive the first content data as sent to the first device using the unicast transmission; and
based at least in part on the third device and the fourth device being unable to receive the first content data as sent to the first device using the unicast transmission, sending a multicast transmission of the first content data to the third device and the fourth device, wherein the multicast transmission indicates more than one device is designated to utilize the first content data for content output.

17. The system of claim 13, the operations further comprising:
determining that second content data is to be sent to a third device;
determining that the second content data is to be sent to a fourth device;
determining that the third device is unable to process the second content data as sent to at least one other device using the unicast transmission;
determining that the fourth device is unable to process the second content data as sent to the at least one other device using the unicast transmission; and
based at least in part on the third device and the fourth device being unable to process the second content data as sent to the at least one other device using the unicast transmission:
  sending the second content data utilizing a multicast transmission, wherein the multicast transmission indicates more than one device is designated to utilize the second content data for content output; and
  sending a command to the first device, the command causing the first device to process the second content data utilizing the multicast transmission such that the first device is caused to send retransmission requests without outputting content corresponding to the second content data.

18. The system of claim 13, the operations further comprising:
- determining that a first wireless component of the first device has been configured to output content sent using the unicast transmission as if the content was sent absent the first identifier based on inclusion of a predefined internet protocol address in the content;
- determining that a second wireless component of the second device has been configured to output content sent using the unicast transmission as if the content was sent absent a second identifier of the second device based on inclusion of the predefined internet protocol address in the content; and
- wherein the first content data is sent utilizing the unicast transmission based at least in part on the first wireless component and the second wireless component being configured to cause output of the content sent using the unicast transmission as if the content was sent absent the first identifier and the second identifier.

19. The system of claim 13, the operations further comprising:
- determining that a first wireless component of the first device has been configured to cause output of content sent using the unicast transmission as if the content was sent absent the first identifier based on inclusion of predefined data in a preamble of a data packet sent to the first device;
- determining that a second wireless component of the second device has been configured to cause output of the content sent using the unicast transmission as if the content was sent absent a second identifier of the second device based on inclusion of the predefined data in the preamble of the data packet sent to the second device; and
- wherein the first content data is sent utilizing the unicast transmission based at least in part on the first device and the second device being configured to cause output of the content sent using the unicast transmission as if the content was sent absent the first identifier and the second identifier.

20. The system of claim 13, the operations further comprising:
- querying a trained model for a selection of a target device to designate to receive the first content data;
- receiving, from the trained model, results data indicating selection of the first device; and
- wherein designating the first device to receive the first content data utilizing the unicast transmission comprises designating the first device to receive the first content data utilizing the unicast transmission based at least in part on the results data from the trained model.

* * * * *